(12) United States Patent
AlGhunaimi et al.

(10) Patent No.: US 11,746,280 B2
(45) Date of Patent: Sep. 5, 2023

(54) PRODUCTION OF BARIUM SULFATE AND FRACTURING FLUID VIA MIXING OF PRODUCED WATER AND SEAWATER

(71) Applicant: Saudi Arabian Oil Company, Dhahran (SA)

(72) Inventors: Fahd Ibrahim AlGhunaimi, Dhahran (SA); Young Chul Choi, Dhahran (SA); Regis Didier Alain Vilagines, Dhahran (SA); Tao Chen, Dhahran (SA); Nahr M. Abulhamayel, Udhailyah (SA); Sultan S. AlOtaibi, Udhailyah (SA)

(73) Assignee: Saudi Arabian Oil Company, Dhahran (SA)

( * ) Notice: Subject to any disclaimer, the term of this patent is extended or adjusted under 35 U.S.C. 154(b) by 111 days.

(21) Appl. No.: 17/347,053

(22) Filed: Jun. 14, 2021

(65) Prior Publication Data

US 2022/0396727 A1    Dec. 15, 2022

(51) Int. Cl.

| | |
|---|---|
| *C09K 8/66* | (2006.01) |
| *C01F 11/46* | (2006.01) |
| *C02F 9/00* | (2023.01) |
| *C09K 8/03* | (2006.01) |
| *C02F 1/00* | (2023.01) |

(Continued)

(52) U.S. Cl.
CPC ............ *C09K 8/665* (2013.01); *C01F 11/462* (2013.01); *C02F 9/00* (2013.01); *C09K 8/032* (2013.01); *C02F 1/001* (2013.01); *C02F 1/24* (2013.01); *C02F 1/283* (2013.01); *C02F 1/285* (2013.01); *C02F 1/385* (2013.01); *C02F 1/40* (2013.01); *C02F 1/42* (2013.01); *C02F 1/44* (2013.01); *C02F 1/52* (2013.01); *C02F 5/02* (2013.01); *C02F 2101/10* (2013.01);
(Continued)

(58) Field of Classification Search
None
See application file for complete search history.

(56) References Cited

U.S. PATENT DOCUMENTS

| | | |
|---|---|---|
| 2,357,559 A | 9/1944 | Smith |
| 2,973,316 A | 7/1957 | Howland |

(Continued)

FOREIGN PATENT DOCUMENTS

| | | |
|---|---|---|
| CA | 1187064 | 5/1985 |
| CA | 2546164 | 3/2007 |

(Continued)

OTHER PUBLICATIONS

PCT International Search Report and Written Opinion in International Appln. No. PCT/US2022/072924, dated Sep. 20, 2022, 14 pages.

(Continued)

*Primary Examiner* — John J Figueroa
(74) *Attorney, Agent, or Firm* — Fish & Richardson P.C.

(57) ABSTRACT

A system and method for generating base water and precipitate, including combining produced water with seawater to precipitate barium sulfate from barium in the produced water and from sulfate in the seawater, and separating the precipitate to give the base water and the precipitate. The base water may have less than a specified amount of sulfate and be utilized for hydraulic fracturing fluid. The precipitate may give a weighting agent for drilling.

7 Claims, 8 Drawing Sheets

(51) Int. Cl.
*C02F 1/24* (2023.01)
*C02F 1/28* (2023.01)
*C02F 5/02* (2023.01)
*C02F 101/10* (2006.01)
*C02F 1/38* (2023.01)
*C02F 1/40* (2023.01)
*C02F 1/42* (2023.01)
*C02F 1/44* (2023.01)
*C02F 1/52* (2023.01)
*C02F 101/32* (2006.01)
*C02F 103/08* (2006.01)
*C02F 103/10* (2006.01)

(52) U.S. Cl.
CPC ...... *C02F 2101/32* (2013.01); *C02F 2103/08* (2013.01); *C02F 2103/10* (2013.01)

(56) References Cited

U.S. PATENT DOCUMENTS

| | | | |
|---|---|---|---|
| 2,818,383 A | 12/1957 | Jolly | |
| 2,844,497 A | 7/1958 | Henricks | |
| 3,098,716 A | 7/1963 | Gradishar et al. | |
| 3,101,250 A | 8/1963 | Schoenbeck | |
| 3,174,828 A | 3/1965 | Hein | |
| 3,462,239 A | 8/1969 | Swanson et al. | |
| 3,516,922 A | 6/1970 | Anzilotti | |
| 3,546,926 A | 12/1970 | Dunavent, Jr. | |
| 3,629,104 A | 12/1971 | Maddox | |
| 3,725,267 A | 4/1973 | Gelblum | |
| 3,959,170 A | 5/1976 | Mago et al. | |
| 3,981,780 A | 9/1976 | Scherrer et al. | |
| 4,057,108 A | 11/1977 | Broussard | |
| 4,100,099 A | 7/1978 | Asperger et al. | |
| 4,100,100 A | 7/1978 | Clouse et al. | |
| 4,158,548 A | 6/1979 | Burk et al. | |
| 4,253,928 A | 3/1981 | Blytas et al. | |
| 4,276,185 A | 6/1981 | Martin | |
| 4,351,673 A | 9/1982 | Lawson | |
| 4,372,873 A | 2/1983 | Nieh | |
| 4,416,333 A | 11/1983 | Mundhenk et al. | |
| 4,543,191 A | 9/1985 | Stewart et al. | |
| 4,945,758 A | 8/1990 | Carpenter | |
| 4,945,992 A | 8/1990 | Sacco | |
| 4,988,389 A | 1/1991 | Adamache et al. | |
| 4,995,952 A | 2/1991 | Dandapani et al. | |
| 5,089,781 A | 2/1992 | Arichika et al. | |
| 5,093,020 A * | 3/1992 | Paul | G21F 9/002 |
| | | | 510/480 |
| 5,158,693 A | 10/1992 | Ramanarayan et al. | |
| 5,188,179 A | 2/1993 | Richard et al. | |
| 5,200,117 A * | 4/1993 | Morris | C02F 5/08 |
| | | | 210/698 |
| 5,225,072 A | 7/1993 | Vidueira | |
| 5,246,597 A | 9/1993 | Jenson et al. | |
| 5,259,980 A * | 11/1993 | Morris | C02F 5/10 |
| | | | 510/435 |
| 5,431,877 A | 7/1995 | Brücken et al. | |
| 5,529,635 A | 6/1996 | Odell | |
| 5,531,865 A | 7/1996 | Cole | |
| 5,556,575 A | 9/1996 | Babaian-Kibala et al. | |
| 5,727,628 A | 3/1998 | Patzner | |
| 5,820,766 A | 10/1998 | Gevertz et al. | |
| 5,869,195 A | 2/1999 | Ramanarayanan | |
| 6,159,374 A | 12/2000 | Hart | |
| 6,241,871 B1 | 6/2001 | Donini et al. | |
| 6,332,448 B1 | 12/2001 | Ilyama et al. | |
| 6,474,349 B1 | 11/2002 | Laker | |
| 6,478,971 B1 | 11/2002 | Koefod et al. | |
| 6,605,234 B1 | 8/2003 | Roof | |
| 6,613,899 B1 * | 9/2003 | Kuzee | C09K 8/528 |
| | | | 536/123 |
| 6,620,341 B1 | 9/2003 | Verma et al. | |
| 6,926,836 B2 | 8/2005 | Fidoe et al. | |
| 6,973,972 B2 | 12/2005 | Aronstam | |
| 6,986,358 B2 | 1/2006 | Mattox et al. | |
| 7,057,050 B2 | 6/2006 | Meyer et al. | |
| 7,093,663 B1 | 8/2006 | Bader | |
| 7,198,722 B2 | 4/2007 | Hussain | |
| 7,306,735 B2 | 12/2007 | Baggott et al. | |
| 7,452,390 B1 | 11/2008 | Al-Khalifa | |
| 7,563,377 B1 | 7/2009 | Simpson | |
| 7,726,398 B2 * | 6/2010 | Collins | E21B 43/20 |
| | | | 166/266 |
| 7,855,171 B2 | 12/2010 | Trahan | |
| 8,015,951 B2 | 9/2011 | Dearth et al. | |
| 8,211,300 B2 | 7/2012 | Partridge et al. | |
| 8,211,548 B2 | 7/2012 | Chun | |
| 8,426,333 B2 | 4/2013 | Bishop et al. | |
| 8,431,508 B2 | 4/2013 | Bishop et al. | |
| 8,459,238 B2 | 6/2013 | Pursifull et al. | |
| 8,580,111 B2 | 11/2013 | Patridge et al. | |
| 8,618,027 B2 | 12/2013 | Meyer et al. | |
| 8,656,869 B2 | 2/2014 | Leone et al. | |
| 8,668,887 B2 | 3/2014 | McGarvey et al. | |
| 8,673,834 B2 | 3/2014 | Trahan | |
| 8,685,236 B2 | 4/2014 | Refere | |
| 9,085,477 B2 | 7/2015 | Banetjee et al. | |
| 9,266,754 B2 | 2/2016 | Wahid | |
| 9,643,865 B2 | 5/2017 | Matherly et al. | |
| 9,708,196 B2 | 7/2017 | Brenize et al. | |
| 10,472,576 B2 | 11/2019 | Sain et al. | |
| 10,501,680 B2 | 12/2019 | Li et al. | |
| 10,563,119 B2 | 2/2020 | Li et al. | |
| 10,579,025 B2 * | 3/2020 | Salino | E21B 41/00 |
| 10,927,799 B2 | 2/2021 | Hamad et al. | |
| 10,934,188 B2 | 3/2021 | Vidic | |
| 2002/0185439 A1 | 12/2002 | Wessels | |
| 2003/0092581 A1 | 5/2003 | Crews | |
| 2005/0263739 A1 | 12/2005 | Mattox et al. | |
| 2006/0029808 A1 | 2/2006 | Zhai et al. | |
| 2007/0108127 A1 | 5/2007 | Talbot et al. | |
| 2007/0215072 A1 | 9/2007 | Dearth et al. | |
| 2007/0246426 A1 * | 10/2007 | Collins | C09K 8/528 |
| | | | 210/651 |
| 2008/0236842 A1 | 10/2008 | Bhavsar et al. | |
| 2008/0289599 A1 | 11/2008 | Kurotani et al. | |
| 2009/0062156 A1 | 3/2009 | Wilson et al. | |
| 2009/0324820 A1 | 12/2009 | Chartier et al. | |
| 2010/0099596 A1 | 4/2010 | Trahan | |
| 2011/0180477 A1 * | 7/2011 | Ganzi | C02F 1/469 |
| | | | 210/190 |
| 2012/0132576 A1 | 5/2012 | Partridge et al. | |
| 2012/0255904 A1 | 10/2012 | Nagghappan | |
| 2012/0273367 A1 | 11/2012 | Themy et al. | |
| 2013/0233786 A1 | 9/2013 | Posa | |
| 2013/0284518 A1 | 10/2013 | Wu et al. | |
| 2014/0011013 A1 | 1/2014 | Jin et al. | |
| 2014/0246382 A1 | 9/2014 | Matza et al. | |
| 2015/0069301 A1 | 3/2015 | Sun et al. | |
| 2015/0083397 A1 | 3/2015 | Monroe et al. | |
| 2015/0240627 A1 | 8/2015 | Gao et al. | |
| 2015/0376033 A1 | 12/2015 | Tao et al. | |
| 2016/0052814 A1 | 2/2016 | Leyendecker et al. | |
| 2017/0081223 A1 | 3/2017 | Hull et al. | |
| 2017/0198198 A1 | 7/2017 | Mahmoud et al. | |
| 2019/0100703 A1 | 4/2019 | Koleshwar et al. | |
| 2019/0135671 A1 | 5/2019 | Banks et al. | |
| 2019/0225867 A1 * | 7/2019 | Li | E21B 43/283 |
| 2020/0140746 A1 | 5/2020 | Li et al. | |
| 2021/0172407 A1 | 6/2021 | Hamad et al. | |

FOREIGN PATENT DOCUMENTS

| | | |
|---|---|---|
| CA | 3143592 | 12/2020 |
| CN | 101037981 | 9/2007 |
| CN | 101289062 | 10/2008 |
| CN | 104520411 | 4/2015 |
| EP | 0230683 | 8/1987 |
| EP | 662504 | 7/1995 |
| EP | 1057988 | 12/2000 |
| EP | 1663879 | 6/2006 |
| EP | 1333108 | 9/2006 |

(56) References Cited

FOREIGN PATENT DOCUMENTS

| EP | 2836524 | 2/2015 |
|---|---|---|
| GB | 1301887 | 1/1973 |
| GB | 1374010 | 11/1974 |
| WO | WO 1993025636 | 12/1993 |
| WO | WO 2004076041 | 9/2004 |
| WO | WO 2013152832 | 10/2013 |
| WO | WO 2014115133 | 7/2014 |
| WO | WO 2015042488 | 3/2015 |
| WO | WO 2016054874 | 4/2016 |
| WO | WO 2016102568 | 6/2016 |
| WO | WO 2017123095 | 7/2017 |
| WO | WO 2017172057 | 10/2017 |

OTHER PUBLICATIONS

4college.co.uk [online], "Bromine," retrieved from URL <http://www.4college.co.uk/as/min/bromine.php>, retrieved on Mar. 31, 2020, available on or before Feb. 25, 2020, 3 pages.

Ahmed et al., "Saudi Aramco drives technological initiatives for groundwater conservation in oil & gas production facilities," IPTC 20086, Presented at the International Petroleum Technology Conference, Dhahran, Saudi Arabia, Jan. 13-15, 2020; International Petroleum Technology Conference, 2020, 14 pages.

Aittola et al., "Thermal stability of ion-exchange resins," KBS Technical Reports, Jan. 1982, 96 pages.

Al-Tammar et al., "Saudi Aramco Downhole Corrosion/Scaling Operational Experience and Challenges in HP/HT Gas Condensate Producers," Saudi Aramco Journal of Technology, May 2014, 13 pages.

amcmud.com [online] "AMC BARITE" AMC Drilling Optimisation, Imdex Limited, 2017, retrieved on Apr. 26, 2021, retrieved from URL <https://amcmud.com/product/amc-barite/>, 1 page.

ASTM G3, "Standard Practice and Conventions Applicable to Electrochemical Measurements in Corrosion Testing," ASTM International, Reapproved 2014, 9 pages.

Azzouzi et al., "Inhibition effect of 1,1'-(pyridine-2,6-dihylbis(methylene))bis(5-methyl-1-Hpyrazole-3-carboxylic acid) on the corrosion of mild steel in 1 M HCL. Part A: Experimental study," Int. J. Corros. Scale Inhibi., 2017, 6(4):463-475, 13 pages.

Bader, "Sulfate removal technologies for oil fields seawater injection operations," J. of Petroleum Science and Engineering, Apr. 2006, 55: 93-110, 18 pages.

Basu et al., "Addressing the challenges of sourcing water for hydraulic fracturing by the use of membrane technologies", SPE-177792-MS, Society of Petroleum Engineers, 2015, 12 pages.

Binghanim et al., "Scale Mitigation Strategy for Fracturing using Seawater-Based Fluid," SPE-188029-MS, Society of Petroleum Engineers, Apr. 2017, 13 pages.

Chen et al., "Novel pore size tuning method for the fabrication of ceramic multi-channel nanofiltration membrane," Journal of Membrane Science, 2018, 552: 77-85.

Crabtree et al., "Fighting Scale—Removal and Prevention," Oilfield Review, Autumn 1999, 16 pages.

Da et al., "Preparation of zirconia nanofiltration membranes through an aqueous sol-gel process modified by glycerol for the treatment of wastewater with high salinity," Journal of Membrane Science, 2016, 504: 29-39.

Dadari et al., "Crude oil desalter effluent treatment using high flux synthetic nanocomposite NF membrane-optimization by response surface methodology," Desalination, Elsevier, Amsterdam, NL, Sep. 2015, 377: 34-46, XP029287214, 13 pages.

Dohare et al., "Pyranpyrazole Derivatives as Novel Corrosion Inhibitors for Mild Steel Useful for Industrial Pickling Process: Experimental and Quantum Chemical Study," Journal of Industrial Engineering Chemistry, 2017, 52:197-210, 14 pages.

El Hajjaji et al., "Corrosion Resistance of Mild Steel Coated with Organic Material Containing Pyrazol Moiety," Coatings, 2018, 8:330, 17 pages.

El-Lateef et al., "Corrosion Protection of Steel Pipelines Against CO2 Corrosion—A Review," Chemistry Journal, 2012, 2(2):52-63, 13 pages.

EnvTech Inc., "ETI Cleaning & Gas Freeing Solution," EnvTech Inc., Jun. 25, 2011, 5 pages.

Feng et al., "Effects of $CO_2$ and $H_2S$ on Corrosion of Martensitic Steels in NaCl at Low Temperature," Paper No. 7659, NACE International, Corrosion 2016 Conference and Expo, Mar. 6-10, 2016, 13 pages.

Ferguson and Ferguson, "The Chemistry of Strontium and Barium Scales", Association of Water Technologies Oct. 20 -23, 2010, Reno, NV, USA, 17 pages.

Ge et al. "Progress on the Extraction Techniques of Bromine," International Symposium on Energy Science and Chemical Engineering (ISESCE 2015), Jan. 2015, 6 pages.

Guo et al., "Fabrication and characterization of TiO2/ZrO2 ceramic membranes for nanofiltration," Microporous and Mesoporous Materials, Apr. 2018, 360: 125-131.

He et al., "Kinetics and Equilibrium of Barium and Strontium Sulfate Formation in Marcellus Shale Flowback Water", J. of Environmental Engineering, Jan. 2014, 140(5): B4014001-1, 9 pages.

Herrag et al., "Pyrazole Derivatives as Corrosion Inhibitors for Steel in Hydrochloric Acid," Portualiae Electrochimica Acta, 2008, 26:211-220, 10 pages.

Hoshowski et al., "The development of novel corrosion inhibitors for high temperature sour gas environments," NACE International Paper No. C-2020-14591, 2020, 9 pages.

Kahyarian et al., "CO2 corrosion of mild steel," Trends in Oil and Gas Corrosion Research and Technologies, Elsevier, 2017, 42 pages.

Kaplan et al., "Assessment of desalination technologies for treatment of a highly saline brine from a potential CO2 storage site," Desalination, Feb. 2017, 404: 87-101.

Koujan Fertilizers & Chemicals, Liquid Potassium Polysulfide, 2018, 1 pages.

Leroy, "Corrosivity of water, criteria for ferrous metal protection by calcium carbonate," European Journal of Water Quality, ASEES, 2012, 43: 75-87, 13 pages, English Abstract only.

Li et al., "A Novel Approach to Predict the Co-Precipitation of BaSO4 and SrSO4", SPE 29489, Society of Petroleum Engineers, Apr. 1995, 447-461, 15 pages.

Li et al., "High-TDS produced water based, low-damaging fracturing fluids for applications at 300oF or higher", SPE-191749-MS, Society of Petroleum Engineers, Sep. 2018, 14 pages.

Liu et al., "Understanding thermal stability and inhibition effectiveness of corrosion inhibitors at high temperatures," NACE International Paper No. 7535, 2016, 11 pages.

Mazumder et al., "Design and synthesis of a novel class of inhibitors for mild steel corrosion in acidic and carbon dioxide-saturated saline media," Corros. Sci., 2014, 87:187-198, 12 pages.

McCafferty et al., "Field Performance in the Practical Application of Chlorine Dioxide as a Stimulation Enhancement Fluid," XP55492044, SPE Production and Facilities, vol. 8, No. 1, Feb. 1, 1993, 6 pages.

Merdhah and Yassin, "Laboratory study and prediction of calcium sulphate at high-salinity formation water," The Open Petroleum Engineering Journal, 2008, 1: 62-73, 12 pages.

Merdhah and Yassin, "Laboratory Study on Precipitation of Barium Sulphate in Malaysia Sandstone Cores", The Open Petroleum Engineering Journal, 2009, 2: 1-11, 11 pages.

Mohamed et al., "Removal of Pyrite and Different Types of Iron Sulfide Scales in Oil and Gas Wells without H2S Generation," XP55492021, International Petroleum Technology Conference, Jan. 1, 2015, 8 pages.

Nasr-El-Din et al., "Iron Sulfide Scale: Formation, Removal and Prevention," International Symposium on Oilfield Scale, Jan. 30, 2001, 13 pages.

Oilfieldwiki.com' [online], "Iron Sulfide (FeS)," available on or before Dec. 30, 2013, via Internet Archive: Wayback Machine URL <https://web.archive.org/web/20131230064221/http://www.oilfieldwiki.com/wiki/Iron_sulfide_(FeS)> [retrieved on Mar. 15, 2018], from URL: <http://www.oilfieldwiki.com/wiki/Iron_sulfide_(FeS)>, 5 pages.

(56) References Cited

OTHER PUBLICATIONS

P.F. Timmins, "Predictive Corrosion and Failure Control in Process Operations: As Applied to the Refining, Petrochemical, and Process Industries," ASM International, Dec. 1996, 23 pages.

Paidar, "Membrane electrolysis—History, current status and perspective," Electrochimica Acta., Aug. 2016, 209:737-756.

Puntervoid and Austad, "Injection of Seawater and Mixtures With Produced Water Into North Sea Chalk Formation: Impact on Wettability, Scale Formation, and Rock Mechanics Caused By Fluid-Rock Interaction," SPE-111237, Society of Petroleum Engineers, Oct. 2007, 12 pages.

Purolite.com [online], "Purolite Bromide Plus /9218," retrieved from URL <https://www.purolite.com/product-pdf/BROMIDE-PLUS-9218.pdI> retrieved on Mar. 31, 2020, available on or before Mar. 31, 2020, 1 page.

Rashid, "Removing problematic sulphates from abundantly available seawater to boost oil recovery operations," GE Sulphate Removal Technology, GE Water & Process Technologies, Oct. 2017, 20 pages.

Richter [online], "Current Research: NF-Membranes for the cleaning of "Recycle Water" in oil sand extractions," Fraunhofer Department of Nanoporous Membranes, 2019, [retrieved o Dec. 24, 2019], retrieved from: URL <https://www.ikts.fraunhofer.de/en/departments/environmental_process_engineering/nanoporous_membranes/zeolite_membranes_nanocomposites/cr_nf_membranes_for_cleaning.html>, 3 pages.

Singare et al., "Study on Halide Ions Selectivity of Industrial Grade Anion Exchange Resin Auchlite A-378," International Letters of Chemistiy, Physics and Astronomy, Mar. 2014, 11(1):44-50.

Singh et al., "Bispyranopyrazoles as Green Corrosion Inhibitors for Mild Steel in Hydrochloric Acide: Experimental and Theoretical Approach," ASC Omega, 2018, 3:11151-11162, 12 pages.

Song et al., "TiO2 nanofiltration membranes prepared by molecular layer deposition for water purification," Journal of Membrane Science, Jul. 2016, 510: 72-78.

Soyluoglu, "Removal of bromide from natural waters: Bromide-selective vs. conventional ion exchange resins," Chemosphere, Jan. 2020, 238:1-9.

Talbot et al., "TetrakisHydroxymethyl Phosphonium Sulfate (THPS) for Dissolving Iron Sulfides Downhole and Topsides—A study of the Chemistry Influencing Dissolution," XP55443209, Corrosion, Apr. 7, 2002, 14 pages.

Usman et al., "Carbon dioxide corrosion inhibitors: A review," Arab. J. Sci. Eng., 2017, 23 pages.

Vasudevan, "Membranes and Diaphragms for Electrochemical Processes (Part-1)," Res. J. Chem. Sci., Feb. 2013, 3(2):1-3.

Veoliawatertechnologies.com [online], "OPUS® Technology: Overview," Veolia Products Listing, 2019, [retrieved on Dec. 24, 2019], retrieved from: URL <https://www.veoliawatertechnologies.com/en/solutions/products/opus-technology>, 4 pages.

Yadav et al., "Electrochemical investigation of Substituted Pyranopyrazoles Adsorption on Mild Steel in Acid Solution," Industrial & Engineering Chemistry Research (I&EC Research), 2012, 51:8194-8210, 17 pages.

Yap et al., "Removing Iron Sulfide Scale: A Novel Approach," XP55443526, Abu Dhabi International Petroleum Exhibition and Conference, Jan. 1, 2010, 10 pages.

Zeidler et al., "Preparation and Characterization of New Low MWCO Ceramic Nanofiltration Membranes for Organic Solvents," Journal of Membrane Science, 2014, 470: 421-430.

Zeidler et al., "New Ceramic Membranes for Organic Solvent Nanofiltration with a Molecular Weight Cut-Off<500 Da," Procedia Engineering, Jan. 2012, 44: 646-648.

Zhang et al., "Corrosion Monitoring Under Iron Sulfide Deposite: Testing Method Development," XP055471382, Corrosion 2014, Mar. 9, 2014, 15 pages.

Zhang, "Solid solution formation kinetics—A preliminary study for CaCO3-BaCO3 and BaSO4-SrSO4 system", Master's Thesis Rice University, Aug. 2013, 24 pages.

* cited by examiner

100

200

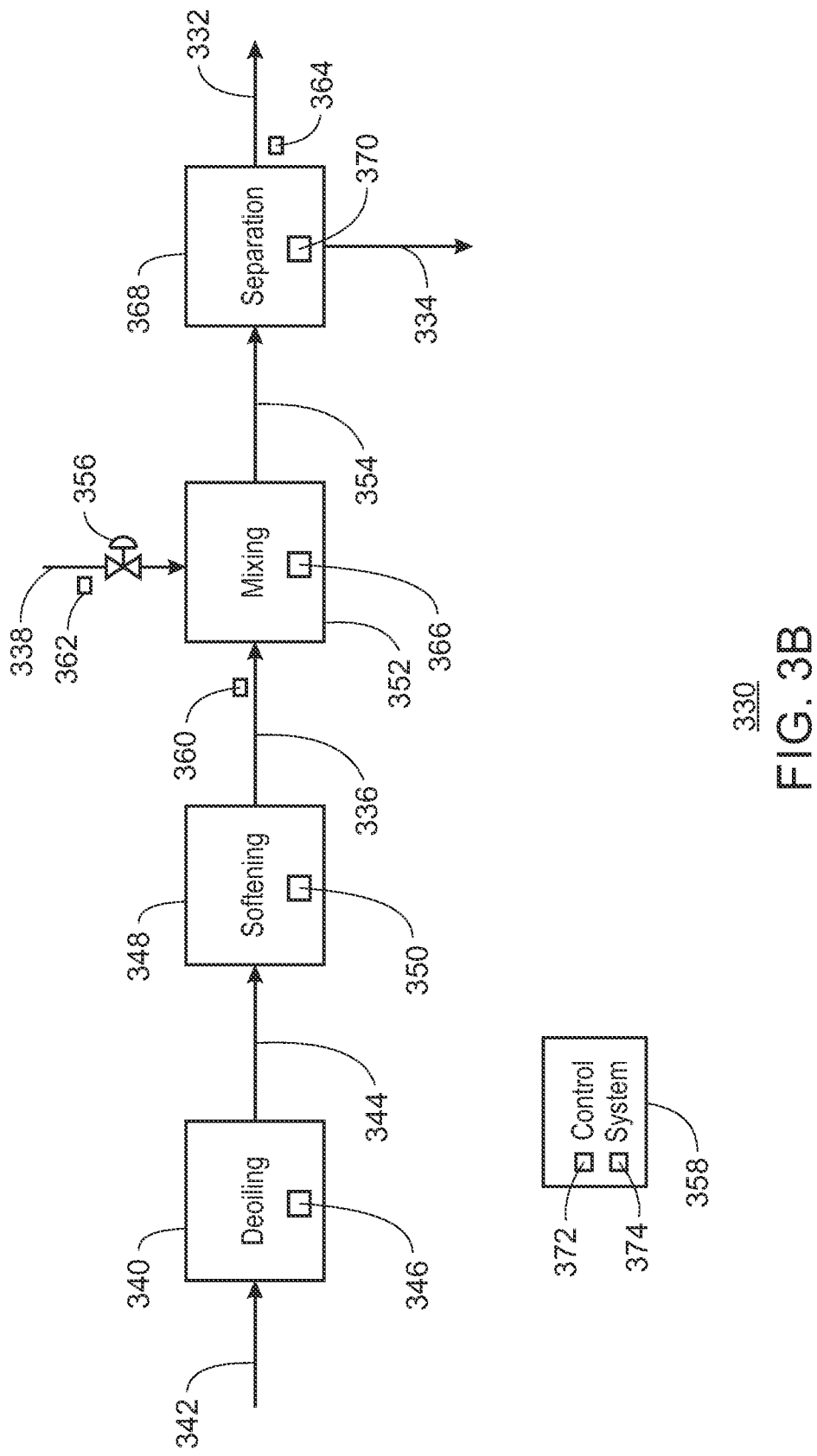

PRODUCTION OF BARIUM SULFATE AND FRACTURING FLUID VIA MIXING OF PRODUCED WATER AND SEAWATER

TECHNICAL FIELD

This disclosure relates to produced water, seawater, and fracturing fluid.

BACKGROUND

Hydraulic fracturing employs fluid and material to generate fractures in a subterranean formation to stimulate production from oil and gas wells. Hydraulic fracturing is a well-stimulation technique in which subterranean rock is fractured by a pressurized fluid that may be a fracturing fluid. The process can involve the pressure injection of fracturing fluid into a wellbore to generate cracks in the deep-rock formations through which natural gas, petroleum, and brine will flow more freely. The fracturing typically generates paths that increase the rate at which production fluids, such as crude oil or natural gas, can be produced from the reservoir formations. Proppant may be employed to maintain the fractures as pressure depletes in the well during hydrocarbon production. The proppant may resist formation closure stresses to keep fractures open. Hydraulic fracturing may allow for the recovery of crude oil and natural gas from unconventional formations that geologists once believed were impossible to produce.

A way to further increase hydrocarbon production is through tertiary recovery also known as enhanced oil recovery (EOR). EOR increases the amount of crude oil or natural gas that can be extracted from a reservoir or geological formation. Although typically more expensive to employ on a field than conventional recovery, EOR can increase production from a well. EOR or tertiary recovery can extract crude oil from an oil field that cannot be extracted otherwise. There are different EOR or tertiary techniques.

Flowback water may be recovered. Flowback water may include water injected during hydraulic fracturing, EOR, and other applications. Further, produced water may typically exist in hydrocarbon (e.g., including crude oil and/or natural gas) received at the wellhead during production. The produced water may be salty water produced along with the hydrocarbon. The produced water may be separated from the hydrocarbon and recovered. Over the life of a well, produced water is generally a significantly greater amount than flowback water.

SUMMARY

An aspect relates to a method of generating base water for hydraulic fracturing fluid and producing barium sulfate. The method includes treating produced water to remove oil from the produced water and to remove calcium and magnesium from the produced water, and combining the produced water with seawater to give a mixture. The method includes precipitating barium sulfate in the mixture from barium in the produced water and from sulfate in the seawater, separating the barium sulfate as precipitated from the mixture to give base water for a hydraulic fracturing fluid, the base water having less than a specified concentration of sulfate, and collecting the barium sulfate as separated to give the barium sulfate as a weighting agent for drilling fluid.

Another aspect is a method generating base water for hydraulic fracturing fluid and producing barium sulfate, including combining produced water having barium with seawater to give a mixture, wherein the produced water is water produced from a subterranean formation in production of hydrocarbon from the subterranean formation. The method includes precipitating barium sulfate in the mixture from the barium in the produced water and from sulfate in the seawater to give precipitate including the barium sulfate. The method includes separating the precipitate from the mixture to give base water for a hydraulic fracturing fluid, the base water having less than a specified maximum concentration of sulfate. The method includes providing the precipitate as separated to give barium sulfate as a weighting agent for drilling fluid.

Yet another aspect is a method of generating base water for hydraulic fracturing fluid and producing barium sulfate. The method includes combining produced water having barium with seawater to give a mixture, wherein the produced water is water produced from a subterranean formation. The method includes precipitating barium sulfate in the mixture from the barium and from sulfate in the seawater, and separating the barium sulfate as precipitated from the mixture to give base water for a hydraulic fracturing fluid, the base water having less than a threshold sulfate concentration. The method includes providing the barium sulfate as separated to give drilling-grade barite as a weighting agent for drilling fluid. The method includes specifying an amount of the seawater combined with the produced water in response to barium concentration in the produced water.

The details of one or more implementations are set forth in the accompanying drawings and the description below. Other features and advantages will be apparent from the description and drawings, and from the claims.

BRIEF DESCRIPTION OF DRAWINGS

FIG. 3B is a diagram of a production system that generates water as a fracturing-fluid base and also generates solid $BaSO_4(s)$ as product.

DETAILED DESCRIPTION

Figure 1:
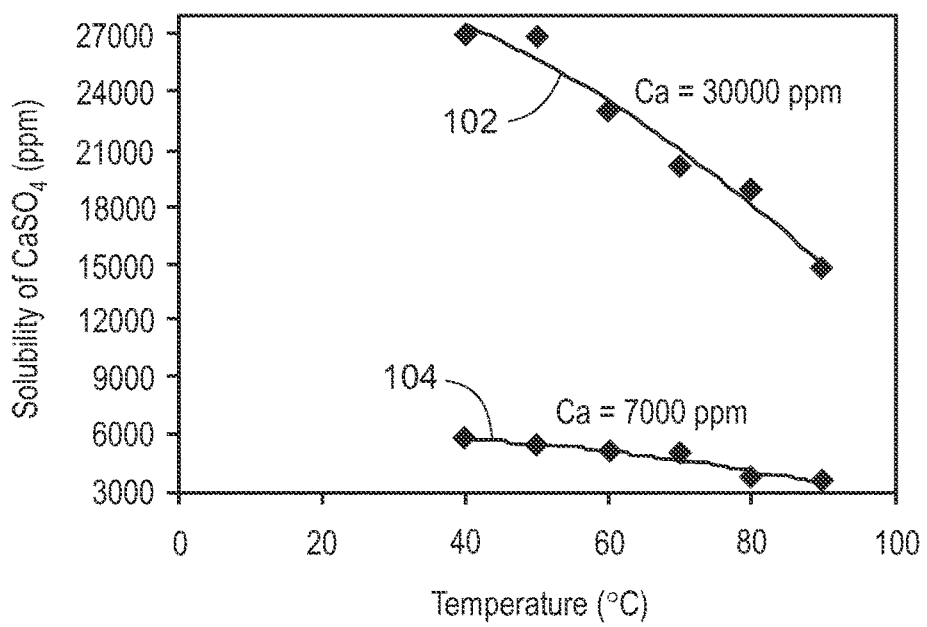
FIG. 1 is a plot of solubility of $CaSO_4$ in water over temperature.

Concerns over depleting freshwater sources have led to the need to develop techniques for utilizing available seawater for various oilfield applications. Hydraulic fracturing, for example, can require millions of gallons of water per treatment and thus alternative sources of water are sought. One of the main issues associated with utilizing seawater directly with no treatment is the presence of sulfate ions in the seawater. When injected into a well, the sulfate can react with certain cations present in the subterranean formation rock and present in the formation brine to produce scale, such as calcium sulfate or barium sulfate. This solid precipitate can have damaging effects upon the subterranean formation. Also, sulfate introduced (via the injection of seawater) to the well can lead to toxic hydrogen sulfide ($H_2S$) production.

Some aspects of the present disclosure are directed to techniques to remove sulfate from seawater while at the same time generating barite (barium sulfate). The sulfate is removed from the seawater via precipitation by mixing produced water (having barium) with the seawater (including at hydrocarbon production sites) to give a fracturing fluid base minus sulfate as precipitated. An advantage may be the synergy that both the barium sulfate (e.g., to be used as drilling barite) and the fracturing fluid base are produced simultaneously in the same production. Further, as indicated, the production of barium sulfate and generation of fracturing fluid base may be performed at a hydrocarbon production site.

The base or water base for a fracturing fluid may be the primary component of the fracturing fluid. Additives directed to conditioning the base for hydraulic fracturing of a subterranean formation may be added to the base to give the fracturing fluid. Fracturing fluid may also called frac fluid or fracking fluid.

The present techniques may blend barium (Ba) from produced water with seawater (e.g., Arabian Gulf seawater) to generate both drilling-grade barite ($BaSO_4$) for drilling and water (with lower sulfate) for fracturing activities in the oil and gas industry. The produced water utilized may refer to the associated and non-associated water present in a subterranean formation that reaches the Earth surface when producing hydrocarbons.

In the utilization of seawater for hydraulic fracturing of hydrocarbon bearing zones (e.g., in the Middle East region of the world), sulfates are removed from the seawater before the seawater is employed for hydraulic fracturing of oil and gas formations.

The combination of produced water (PW) (if having adequate barite) and seawater can yield $BaSO_4(s)$ as a solid precipitate, which is commonly used as a weighting agent for most or all types of drilling fluids. The solid precipitate can be readily separated from water and collected. The treated water can thus be the combination of the PW and seawater minus the removed precipitated $BaSO_4(s)$. The treated water will approach being barium and sulfate free, which may make the treated water suitable as base fluid for hydraulic fracturing of tight oil and gas reservoirs in unconventional (shale) formations for hydrocarbon production. The treated water can also be an injection fluid for enhanced oil recovery (EOR) in conventional and unconventional reservoirs.

Blending the produced and seawater may involve multiple preparation stages. In other words, both feed water streams (PW and seawater) may be pretreated. The PW may be treated for oil and particles removal. The particles removal may lower the total suspended solids (TSS) in the PW. It may also beneficial to treat the seawater such that the seawater is generally free of particles. The mixing of the PW and seawater streams may be performed at thermodynamic conditions allowing the sulfate precipitate to form. The sulfate precipitate may then be separated from the water mixture. Again, embodiments may produce both valuable barite and fracking quality water contemporaneously (e.g., simultaneously) in the same process.

The techniques may specify beneficial blending ratios between Ba (in the PW) and sulfate (in the seawater) to give the recovery of useable seawater and formation water for fracturing operations in unconventional oil and gas assets. Embodiments may also employ in situ treatment of flowback water to be utilized during hydraulic fracturing operations. The "in situ" treatment may mean treatment at the Earth surface at the well sire and can be performed in real time as the flowback water is received. The flowback water (having barium) may be pretreated (if desired) and mixed with the seawater to give base water for the fracturing fluid.

The blending of PW and seawater can lead to precipitates formation. For example, the cations barium (Ba), strontium (Sr) and calcium (Ca) in the produced water can react with the anion sulfate ($SO_4$) in the seawater to form precipitates. These precipitation reactions form solid precipitates barium sulfide ($BaSO_4$), strontium sulfate ($SrSO_4$), and calcium sulfate ($CaSO_4$):

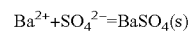

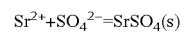

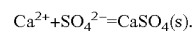

These three chemical reactions for precipitation via the blending of PW and seawater generally do not require exotic conditions with respect to pressure and temperature. Instead, the reactions can occur at pressures and temperatures existing in ambient ranges, mild industrial processes, or underground reservoir conditions. The likelihood and severity of these precipitates and associated scale formation can be evaluated.

For instance, $CaSO_4(s)$ is not likely to form at a water temperature below 40° C., as indicated by FIG. 1. The experimental data depicted in FIG. 1 supports that $CaSO_4$ remains in the dissolved form at typical ambient temperatures less than 35° C. (and at an ambient pressure of 1 atmosphere).

FIG. 1 is a plot 100 of solubility of $CaSO_4$ in parts per million (ppm) in water over temperature (° C.) of the water. The use of "ppm" herein is generally meant by weight. Two curves 102 and 104 are depicted. The solubility of $CaSO_4$ increases with decreasing temperature. The curve 102 is for the water having a concentration of the calcium cation at 30,000 ppm. As the temperature decreases to 40° C., the curve 102 approaches the 30,000 ppm solubility of $CaSO_4$ indicating that $CaSO_4$ will not form as the temperature decreases to below 40° C. The curve 104 is for the water having a concentration of the calcium cation at 7,000 ppm. As the temperature decreases to 40° C., the curve 104 approaches the 7,000 ppm solubility of $CaSO_4$ indicating that $CaSO_4(s)$ will not form as the temperature decreases to below 40° C. The calcium concentration was determined via atomic absorption spectrometry.

On the other hand, $BaSO_4(s)$ precipitates form easily at ambient temperatures (and ambient pressure). To illustrate this, FIG. 2 shows solubility of $BaSO_4$ measured at different temperatures at ambient pressure (1 atmosphere).

Figure 2:
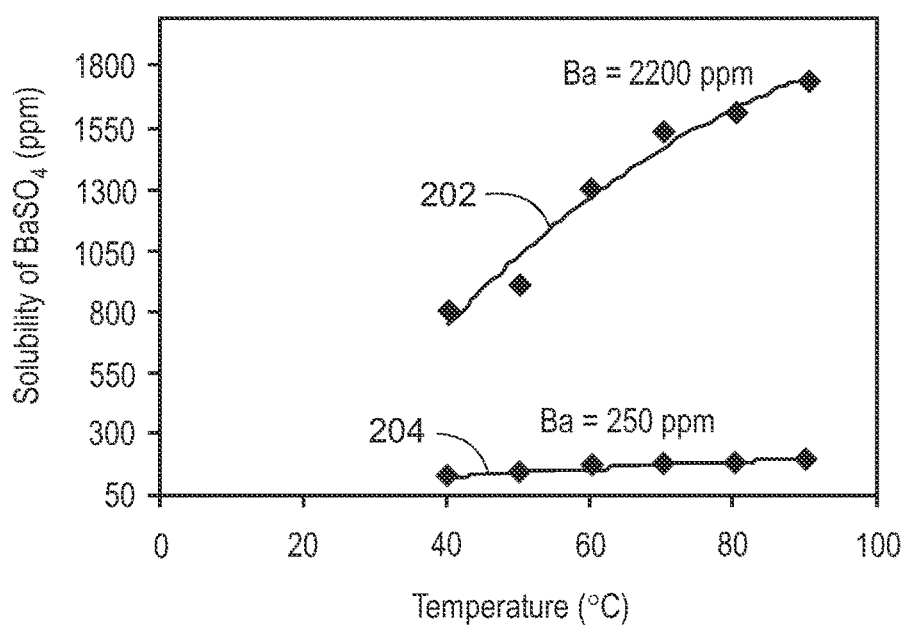
FIG. 2 is a plot of solubility of $BaSO_4$ in water over temperature.

FIG. 2 is a plot 200 of solubility of $BaSO_4$ (ppm) in water over temperature (° C.) of the water. Two curves 202 and 204 are depicted. The solubility of $BaSO_4$ decreases with decreasing temperature. The curve 202 is for the water having a concentration of the barium cation at 2,200 ppm. As the temperature decreases to 40° C., the curve 302 is well below the 2,200 ppm solubility of $BaSO_4$. The curve 204 is for the water having a concentration of the calcium cation at 250 ppm. As the temperature decreases to 40° C., the curve 204 is well below the 250 ppm solubility of $BaSO_4$. The experimental data depicted in FIG. 2 supports that $BaSO_4(s)$ will form (precipitate) at typical ambient temperatures less than 35° C. (and at an ambient pressure of 1 atmosphere). The barium concentration was determined via atomic absorption spectrometry.

Also, $SrSO_4(s)$ is unlikely to form at temperature below 40° C., unless there is a significant concentration of sulfates residual remaining in the water mixture after $BaSO_4(s)$ formation. Below is a summary of potential precipitates that can occur when mixing seawater and produced. Calcium carbonate $[CaCO_3(s)]$ and magnesium hydroxide $[Mg(OH)_2(s)]$ as possible precipitates are discussed in addition to the aforementioned three precipitates.

$CaCO_3(s)$ is likely to form, but the amount may be limited by the carbonate ($CO_3$) concentration in the mixture. The $CO_3$ in the mixture is generally from the seawater. The $CO_3$ concentration in seawater is typically relatively low, such as less than 150 ppm. In implementations, with the mixture of seawater and PW being less than 30 volume percent (vol %) of seawater, the precipitation of $CaCO_3(s)$ may remove less than 1% of Ca in the mixture.

$Mg(OH)_2(s)$ will generally not form unless the pH is 10.3 or higher. Thus, $Mg(OH)_2(s)$ precipitation is unlikely to occur. Therefore, Mg (or most of the Mg) may typically remain dissolved in ionic form. Little or no $MgSO_4$ precipitation is generally expected. In other words, the Mg ion concentration in the water is low compared to Ca and Ba, and also the solubility of $MgSO_4$ is much greater than $CaSO_4$ and $BaSO_4$. No $MgSO_4$ forms (or is predicted to form) under these conditions.

$BaSO_4(s)$ may typically form at the highest concentration among the precipitates. The kinetics of the $BaSO_4(s)$ formation (precipitation) will generally be fast at ambient temperatures. At temperatures (e.g., 100° C.) greater than ambient, $BaSO_4(s)$ formation may be dominant compared to $CaSO_4(s)$ formation.

$SrSO_4(s)$ will generally not form at significant concentration. The solubility limit of $SrSO_4$ is much higher than $BaSO_4$ and the solids formation start at much higher concentration than the threshold. Thus, again, unlikely to form much of $SrSO_4(s)$ in the mixture.

$CaSO_4(s)$ has potential to form, but at much lower quantities compared to $BaSO_4(s)$ formation. The activation energy $CaSO_4$ is much higher than $BaSO_4$.

Consequently, in view of the foregoing, $BaSO_4(s)$ is generally the most dominant form of precipitate. $CaCO_3(s)$ may also form but the quantity will be much smaller than $BaSO_4(s)$. The formation of other precipitates can be controlled (reduced) by controlling the mixture temperature and the blending ratio of seawater and PW in the mixture.

Therefore, by limiting the residual $SO_4$ in the mixture, the techniques can approach complete removal Ba and $SO_4$ from the water while producing a solid precipitate highly concentrated in $BaSO_4(s)$ that meets American Petroleum Institute (API) specifications (e.g., API Specification 13A, 18th Edition) as a weighting agent for drilling fluids. A weighting agent, also known as weighting material, may be a high-specific gravity and finely divided solid material utilized to increase density of a drilling fluid. To beneficially reduce the concentration of Ba and $SO_4$ the mixture for utilization as fracturing fluid base while also forming $BaSO_4(s)$ as a product as a weighting agent, the blending of PW and seawater can be performed and adjusted depending on the Ba concentration in the PW and the $SO_4$ concentration in the seawater.

Table 1 shows the typical ionic composition of Arabian Gulf seawater sampled off the Saudi Arabian coast. The concentration values are given in milligrams per liter (mg/L). The concentration of each solute may vary slightly depending on the sampling location.

TABLE 1

| Ionic composition of Arabian Gulf Seawater | |
|---|---|
| Solute | Concentration |
| Boron | <1 mg/L |
| Barium | <1 mg/L |
| Calcium | 618 mg/L |
| Iron | <1 mg/L |
| Magnesium | 2,108 mg/L |
| Potassium | 595 mg/L |
| Silicon | <1 mg/L |
| Sodium | 18,451 mg/L |
| Strontium | 11 mg/L |
| Chloride | 30,694 mg/L |
| Sulfate | 4,142 mg/L |
| Carbonate | <1 mg/L |
| Bicarbonate | 150 mg/L |
| Total Dissolved Solids | 56,800 mg/L |

Table 2 shows examples of the ionic compositions of oilfield PW (formation water), seawater (not nanofiltered), nanofiltered seawater that may be implemented with examples of the present techniques. A purpose of nanofiltration of seawater may be to remove sulfate from the in seawater and make seawater more suitable for incorporation in fracturing fluid without heavy scale deposition when the fracturing fluid mixes with formation water in the near wellbore region. The seawater in Table 2 is Saudi Arabia seawater that may be labeled as Arabian seawater or Arabian Gulf seawater. The nanofiltered seawater is the Saudi Arabia seawater as nanofiltered. The PW and seawater may be mixed at varying volumetric concentrations (e.g., 70 vol % PW and 30 vol % seawater). Calculations may be implemented to confirm compatibility of component concentrations and desirability of the particular volumetric concentrations of the PW and seawater in the mixture. The compositions as given in Table 2 were utilized (tested) in the present experimental simulations discussed below. The ions listed in Table 2 include sodium (Na), potassium (K), chlorine (Cl), and bicarbonate ($HCO_3$) in addition to the aforementioned ions.

TABLE 2

| Example compositions of produced water and seawater | | | |
|---|---|---|---|
| Ion | Tested Formation Water, ppm | Saudi Arabia Seawater, ppm | Nanofiltered Seawater, ppm |
| $Na^+$ | 7000 | 16 180 | 16 280 |
| $Ca^{2+}$ | 25 000 | 650 | 213 |
| $Mg^{2+}$ | 2000 | 1730 | 256 |
| $K^+$ | 4000 | 700 | 519 |
| $Sr^{2+}$ | 2000 | 1 | <1 |
| $Ba^{2+}$ | 4000 | <1 | 0 |
| $Cl^-$ | 160 000 | 31 000 | 26 401 |
| $SO_4^{2-}$ | 200 | 4020 | 297 |
| $HCO_3^-$ | 0 | 126 | 103 |

Formation water (produced water) has significantly higher concentrations of Ca and Ba compared to seawater, but formation water typically does not contain by itself sufficient amounts of carbonate and sulfate to form $CaCO_3(s)$ or $BaSO_4(s)$. Seawater, on the other hand, contains high levels of carbonate and sulfate, but seawater alone typically does not have adequate amounts of Ca and Ba to form $CaCO_3(s)$ or $BaSO_4(s)$. PW is typically formation water and can include water injected from the surface that is subsequently produced (e.g., as flowback water). Though PW can be distinguished from flowback water. Yet, as discussed, embodiments are applicable to flowback water.

In implementations, when the formation water and seawater, such as having the Table 2 compositions, are blended, ions will start to react and the most likely precipitation to occur first is $CaCO_3(s)$. However, the amount of $CaCO_3(s)$ precipitated will be low due to the very low concentration the bicarbonate ($CO_3$). Following this will be formation of $BaSO_4(s)$, which is typically the desired precipitation. Other precipitates, such a $CaSO_4(s)$ and $SrSO_4(s)$, are also likely to occur, if there are high enough concentrations remaining for those ions. By limiting the residual sulfate concentration, these $CaSO_4(s)$ and $SrSO_4(s)$ precipitates that may form can be suppressed. The limiting of the residual sulfate may mean to utilize most of the sulfate for the precipitation of $BaSO_4(s)$.

Figure 3A:
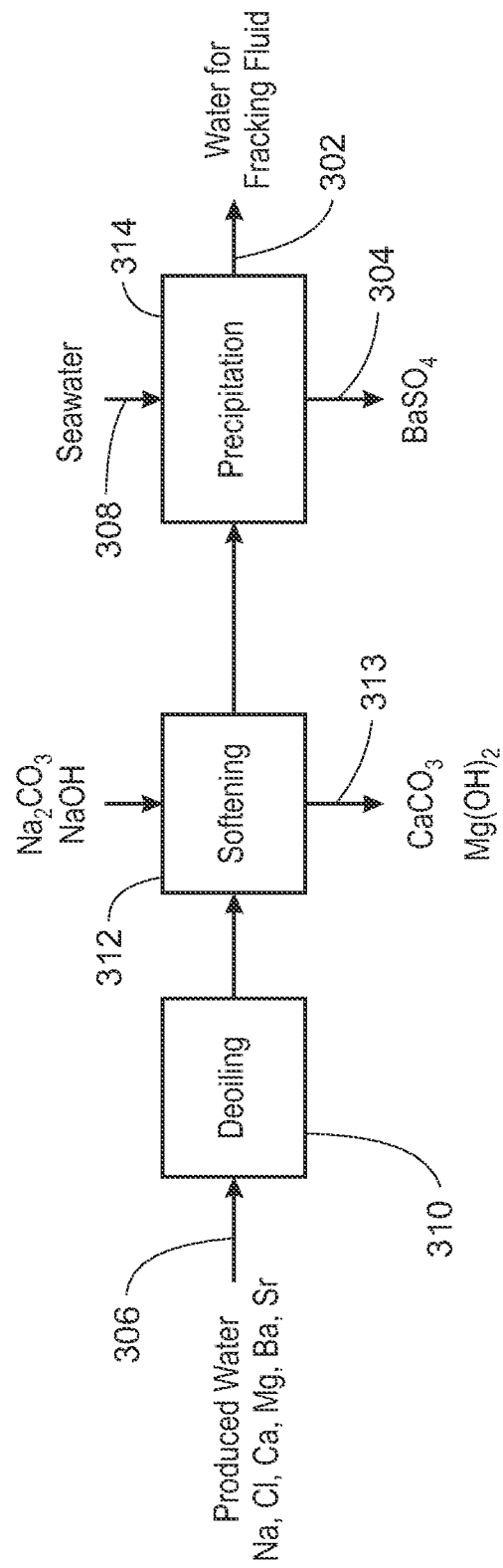
FIG. 3A is a diagram of a method of generating water as a fracturing-fluid base and also generating $BaSO_4(s)$ as product

FIG. 3A is a method 300 of generating water 302 as a fracturing-fluid base and also generating $BaSO_4(s)$ 304 as product. The method 300 combines (e.g., mixes) PW 306 (having barium) and seawater 308 (having sulfate) to give the water 302 and the $BaSO_4(s)$ 304 as two separate product streams. The amount of seawater 302 may be, for example, less than 30 vol % of the mixture, and thus the amount of PW 306 may be, for example, at least 70 vol % of the mixture. The PW 306 can typically be formation water as produced, but can also be or include flowback water. The water 302 (for fracturing fluid) that is the mixture of seawater 308 and PW 306 minus the precipitated $BaSO_4$ beneficially approaches sulfate-free (e.g., less than 900 ppm sulfate). The method produces relatively sulfate-free base (injection) water 302 and high $BaSO_4$ concentration precipitate ($BaSO_4(s)$ 304).

At block 310 of the method, deoiling of the PW 306 is performed to remove organic contaminants (e.g., crude oil) from the PW 306. In the deoiling, the PW 306 is separated from its organic contaminants. This can be done by different techniques including, for example, centrifuge separation (e.g., hydrocyclones), floatation (e.g., induced gas floatation or dissolved gas floatation), filtration (e.g., via a nutshell filter or ceramic membrane), or adsorption (e.g., via an activated charcoal filter or polymer adsorbents). The removal of organic content from the PW 306 does not need to be complete as some remaining organic matter in the PW 306 (and thus in the water 302) may beneficially contribute to protect the facilities against corrosion by reacting with peroxide radicals generated by the incipient corrosion reaction. In some implementations, block 310 can be an optional action of the method 300 and not performed.

At block 312, the PW 306 as deoiled is subjected to softening. In some implementations, block 312 can be an optional action of the method 300 and not performed. Water softening may be the removal of calcium, magnesium, and certain other metal cations found in hard water. In the softening 312, the hardness of the PW 306 is controlled by the addition of sodium carbonate ($Na_2CO_3$) or sodium hydroxide (NaOH). Softening mean removing Ca and Mg. The softening can be washing or precipitation as described here, or can be via ion exchange. With precipitation as described here, the removed Ca and Mg ions may include $CaCO_3$ and $Mg(OH)_2$ in solution in water, as indicated by reference numeral 313. The addition of $Na_2CO_3$ give $CaCO_3$ but generally not $MgCO_3$ because it also raised the pH so Mg will typically be precipitated and removed by forming the $Mg(OH)_2$. The addition of NaOH gives $Mg(OH)_2$ but generally not $Ca(OH)_2$ because is $Ca(OH)_2$ highly soluble and thus little or no precipitate, whereas $Mg(OH)_2$ will typically form at any high pH. Techniques for water softening, such as may be implemented in the softening 312 via the precipitation described, or via washing the PW 306 or treating the PW 306 utilizing ion-exchange resin.

In order to avoid that the PW 306 (and thus the water 302) significantly corrodes equipment, the removal of calcium and magnesium may be partial in the softening 312. The alkaline cations Ca and Mg that remain may beneficially contribute to form a corrosion protective layer on metallic walls. The calcium and magnesium ions combined with hydrogen carbonate ions may slow the rate of corrosion inside process facilities.

The reactions of peroxide radicals with organic materials and alkaline cations Ca and Mg may slow down the oxidation of divalent iron. Therefore, the presence of some Ca and Mg ions remaining in the PW 306 may have the advantageous consequence of slowing down the corrosion rate in the facilities implementing the present techniques.

At block 314, the PW 306 as deoiled and softened is mixed with seawater 308 at a specified volumetric percentage of seawater 308 and at specified operating conditions of temperature and pressure to form $BaSO_4(s)$. The seawater 308 may be seawater not nanofiltered or nanofiltered seawater. The seawater 308 may be treated to remove particles prior to mixing with the PW 306. The seawater 308 may be, for example, less than 40 vol % or less than 30 vol % of the mixture (water mixture), such as in the range of 10 vol % to 40 vol %. To minimize or reduce the residual Ba and residual sulfate concentrations in the mixed water after removal of the $BaSO_4(s)$ precipitate, the blend of the PW 306 and seawater 308 may be specified near or at the stoichiometric ratio of Ba and sulfate, which is about 1.43 Ba to 1 sulfate on a molar basis. Depending on the Ba concentration in the produced water and the sulfate in the seawater, different blending ratios can be used. Embodiments may rely on the PW 306 (as produced from the subterranean formation) for the barium. Thus, implementations may avoid adding barium (e.g., as barium chloride) to the mixture.

The mixture of the PW 306 (deoiled and softened) and the seawater 108 may be sent to a separator vessel to separate the precipitated $BaSO_4(s)$ solids from the mixture. For example, the mixture may be sent to a decanter vessel where the $BaSO_4(s)$ solids are allowed adequate residence time to segregate by gravity. Typically, a residence time, for example, between 20 minutes and 4 hours may be implemented for good separation of the precipitate suspended in the water. Due to the small size of the precipitate crystals formed, the surface averaged water velocity inside the decanter or gravity separator should generally not exceed 5 centimeters (cm) per second. The surface averaged water velocity inside the decanter or gravity separator may be, for example, the total water volume flowrate divided by the flow surface area in any cross-flow plane inside the decanter. ppm In the event that a large decanter vessel cannot be installed, for example in some offshore applications or in other locations where available space is limited, filtration of the mixed water to separate the $BaSO_4(s)$ precipitate from the mixed water can be utilized as an alternative to gravity separation. The mesh size of the filter may be, for example, less than 0.5 microns (μm), or in the range of 0.1 μm and 1 μm.

The water 302 discharged from the separator vessel, e.g., decanter (gravity-separation vessel) or filter vessel, can be utilized for a fracturing fluid. Typical additives for fracturing fluids can be added to the water 302 to give a fracturing fluid that can be employed in the hydraulic fracturing of a subterranean formation. Seawater 308 high in sulfate is utilized to give the water 302 but the water 302 is low in sulfate.

The equipment (e.g., mixing device, decanter vessel, etc.) employed in the precipitation 314 may be configured to reduce the scaling risk while promoting the bulk precipitate formation. In particular, equipment may be non-metallic materials or have a scaling-resistant coating on inner walls. Embodiments may involve implementing corrosion prevention techniques that prevent or slow down the oxidation of divalent iron. Further, a scale mitigation strategy involving periodic injection of selected chemicals may be applied.

The sulfate concentration in the base water 302 will generally be the sulfate concentration in the fracturing fluid incorporating the base water 302 because the fracturing fluid primarily includes the base water 302. The specified maximum concentration of sulfate in the water 302 acceptable may depend on water chemistry of the fracturing fluid with the formation water of the subterranean formation being subjected to the hydraulic fracturing. The higher the concentrations of Ba, Ca, and Sr in the formation water, the lower the sulfate should be in the fracturing fluid. Some sulfate in the fracturing fluid may be acceptable because a scale inhibitor can be added to the fracturing fluid to address scale potential, such as in the near wellbore region. The specified maximum sulfate concentration in the water 302 may be, for example, 1000 ppm, 900 ppm, 800 ppm, 700 ppm, 600 ppm, or 500 ppm. As a point of reference, nanofiltration of seawater can give a sulfate concentration in the seawater, for example, of 200 ppm.

FIG. 3B is a production system 330 that may implement the method 300 of FIG. 3A. The production system 300 generates water 332 as a fracturing-fluid base and also generates solid $BaSO_4(s)$ 334 as product. In operation, the system 330 mixes deoiled and softened PW 336 with seawater 338 to give the water 332 and precipitated $BaSO_4(s)$ 334 as two separate product streams. While the seawater 338 has a significant amount of sulfate, the water 332 (generated for the fracturing fluid) that includes the seawater 338 beneficially approaches sulfate-free due to removal of the sulfate via precipitation of the $BaSO_4(s)$. The sulfate concentration in the water 332 may be, for example, less than 900 ppm.

The production system 300 incudes a deoiling system 340. The deoiling system 340 receives PW 342 and discharges deoiled PW 344. The PW 342 may be water produced from a subterranean formation in the production of hydrocarbon from the subterranean formation. Thus, the PW 342 may be water separated from hydrocarbon produced from a subterranean formation. The PW 342 may include Na, Cl, Ca, Mg, Ba, and Sr.

The deoiling system 340 may include a vessel 346 to perform deoiling of the PW 342. The organic contaminants removed in the deoiling may include free oil and immiscible hydrocarbons more generally. The contaminants can include dissolved organics as well as in solid forms. The vessel 346 may be a centrifuge or hydrocyclone that removes organic contaminants from the PW 342. The vessel 346 may be a flotation vessel utilized to perform induced gas floatation or dissolved gas floatation to deoil the PW 342. The vessel 346 may be a filter vessel (housing) having a filter element to filter the PW 342 to deoil the PW 342. The filter vessel may be a nutshell filter vessel having nut shell media as the filter element. The filter vessel be a filter housing having a ceramic membrane as the filter element. Ceramic membranes be formed from inorganic materials and utilized in membrane operations for liquid filtration. Other filter types are applicable. The vessel 346 may be an adsorption vessel that has, for example, an activated charcoal filter or polymer adsorbents to filter the PW 342 to deoil the PW 342.

A softening system 348 (softener) may receive the deoiled PW 344. The softening system 348 may removes ion, such as calcium and magnesium, from the deoiled PW 344 to soften the PW 344. The purpose of the softening may be to reduce scaling (e.g., Ca, Mg minerals deposition). The softening may reduce the Ca and Mg to prevent or reduce scale formation [e.g., $CaCO_3$, $Mg(OH)_2$)] in the pipe, tanks, membranes, injection conduits, wellbore, etc. When fracturing fluid having PW is mixed the incompatible waters downhole, scaling could form on surface in downhole tubing and in the near wellbore regions in the subterranean formation (reservoir).

The softening system 348 may include a vessel 350 to remove ions that contribute to water hardness from the deoiled PW 344. The vessel 350 may be a wash vessel to wash the deoiled PW 344 to remove the hardening ions. The vessel 350 may be an ion-exchange vessel having ion-exchange resin to remove hardening ions (e.g., Mg and Ca) from the deoiled PW 344. The softening system 348 may discharge deoiled and softened PW 336 for addition to (combining with) the seawater 338.

The mixing system 352 may receive the deoiled and softened PW 336 and combine the deoiled and softened PW 336 with the seawater 338 to give a mixture 354. The amount of seawater 338 for the mixture 354 may be controlled to give a specified volume percent of the seawater 338 in the mixture 354 or a specified volume ratio of the seawater 338 to the PW 336 in the mixture 354. In some implementations, a flow control valve 356 may control (e.g., maintain, adjust, modulate, etc.) the rate or amount of the seawater 338 incorporated into the mixture 354. In implementations, the flow rate of the PW 336 and the flow rate of the seawater 338 may be measured by respective flow meters (not shown) disposed along the conduits conveying the PW 336 and seawater 338, respectively. The flow rates as measured by the flow meters may be indicated to a control system 358. A flow control valve may also be disposed along a conduit conveying the PW 336 to control flow rate of the PW 336.

The amount of seawater 338 incorporated into the mixture 354 of the seawater 338 and the PW 336 may be in response to the barium ion ($Ba^{2+}$) concentration in the PW 336 and the sulfate ion ($SO_4^{2-}$) concentration in the seawater 338. In other words, the molar ratio of the $SO_4^{2-}$ to the $Ba^{2+}$ may be specified (e.g., at or near the stoichiometric ratio) to give a beneficial amount of $BaSO_4$ precipitation so that the residual sulfate ($SO_4^{2-}$) in the water 332 will be low (e.g., below a specified sulfate concentration threshold).

The PW 336 (or 342, 344) may be sampled and the barium concentration measured in the laboratory. The measured barium concentration may be entered by a human operator into the control system 358 via a user interface of the control system 358. In some implementations, an online instrument analyzer 360 (e.g., online spectrometer) disposed along the conduit conveying the PW 336 (or 342, 344) to measure the barium concentration in the PW 336 (or 342, 344) in real time. An instrument transmitter may indicate the barium concentration as measure by the online instrument analyzer 360 to the control system 358.

The seawater 334 may be sampled and the sulfate concentration measured in the laboratory. The measured sulfate concentration may be entered by a human operator into the control system 358 via a user interface of the control system 358. In some implementations, an online instrument analyzer 362 (e.g., online spectrometer, ultraviolet oxidative instrument, ion chromatograph instrument, etc.) disposed along the conduit conveying the seawater 338 to measure the sulfate concentration in the seawater 338 in real time. An instrument transmitter may indicate the sulfate concentration as measured by the online instrument analyzer 362 to the control system 358.

The water 332 generated may be sampled and the sulfate concentration measured in the laboratory. The measured sulfate concentration may be entered by a human operator into the control system 358 via a user interface of the control system 358. In some implementations, an online instrument analyzer 364 (e.g., same or similar to the analyze 362) disposed along the conduit conveying the water 332 to measure the sulfate concentration in the water 332 in real time. An instrument transmitter may indicate the sulfate concentration as measured by the online instrument analyzer 364 to the control system 358.

In certain implementations, the control system 358 may adjust (e.g., via the control valve 356) the amount of seawater 338 combined with the PW 336 in response to the barium concentration as measured in the PW 336, the sulfate concentration in the seawater 338, and the sulfate concentration in the generated water 332. The adjustment by the control system 358 may be automatic. The adjustment by the control system 358 may be in real time. The control system 358 may also (or instead) adjust the amount of the PW 346 incorporated into the mixture 354.

The mixing system 352 may have a vessel 366 to combine the seawater 338 and the PW 336. The vessel 366 may be a mixing vessel, for example, with an agitator or blender to promote mixing of the seawater 338 with the PW 336. Precipitation of the solid $BaSO_4(s)$ 334 may occur in the vessel 366. In implementations, the vessel 366 may hold a relatively large volume of the mixture 354 and be, for example, a large open-air tank or pool, and allow for precipitation under static conditions. In other implementations, the seawater 338 and the PW 336 may be combined inline in a conduit. If so, an inline static mixer may be include in the conduit to promote mixing of the seawater 338 with the PW 336. Precipitation of the solid $BaSO_4(s)$ 334 may occur in the conduit. The PW may be mixed with the seawater in piping by adding (e.g., via a pipe tee) the seawater from a pipe conveying the seawater to a pipe conveying the PW.

The mixture 354 may be provided to a separation system 368 in which the solid $BaSO_4(s)$ 334 is removed from the mixture 354 to give the water 332. Precipitation of the solid $BaSO_4(s)$ 334 can occur in the separation system 368, depending on the implementation.

The separation system 366 may include a separator vessel 370 to remove the $BaSO_4(s)$ 334 from the mixture 354 and discharge the $BaSO_4(s)$ 334 as product. The separator vessel 370 may also discharge the water 332 as product (e.g., to be utilized as base fluid for fracturing fluid). The sulfate concentration in the water 322 may be, for example, less than 900 ppm. Precipitation of the solid $BaSO_4(s)$ 334 can occur in the separator vessel 370, depending on the implementation.

The separator vessel 370 may be a decanter vessel where the BaSO4(s) solids are allowed adequate residence time to segregate by gravity. Typically, a residence time, for example, of at least 20 minutes (e.g., between 20 minutes and 4 hours) may be implemented to separate the precipitate 334 in the mixture 354. In certain implementations, due to the relatively small size of the precipitate crystals formed as the $BaSO_4(s)$ precipitate 334, the surface averaged water velocity inside the decanter or gravity separator may be less than 5 cm per second or less than 10 cm per second. In other embodiments, the separator vessel may be a filter vessel having a filter element to separate the $BaSO_4(s)$ precipitate from the mixed water 354. The mesh size of the filter element may be, for example, less than 0.5 μm, or in the range of 0.1 μm and 1 μm.

The equipment (e.g., the mixing vessel 366, separator vessel 370, etc.) employed in the mixing system 352 and the separation system 368 may be configured to reduce the scaling risk while promoting the bulk precipitate formation. In particular, equipment may be non-metallic materials, or have a coating on inner walls such as polytetrafluoroethylene (PTFE), ethylene tetrafluoroethylene (ETFE) (e.g., heat-cured Saekaphen™), epoxy, or Teflon™, and the like. Embodiments may involve implementing corrosion prevention techniques. Further, a scale mitigation strategy involving periodic injection of selected chemicals may be implemented.

The control system 358 may facilitate or direct operation of the production system 300, such as the supply or discharge of flow streams (including flow rate) and associated control valves, control of operating temperatures and operating pressures, and control of vessels, pumps, filters, and so on. The control system 358 may include a processor 372 and memory 374 storing code (e.g., logic, instructions, etc.) executed by the processor 372 to perform calculations and direct operations of the system 300. The control system 358 may be or include one or more controllers. The processor 372 (hardware processor) may be one or more processors and each processor may have one or more cores. The hardware processor(s) may include a microprocessor, a central processing unit (CPU), a graphic processing unit (GPU), a controller card, circuit board, or other circuitry. The memory 374 may include volatile memory (e.g., cache and random access memory), nonvolatile memory (e.g., hard drive, solid-state drive, and read-only memory), and firmware. The control system 358 may include a desktop computer, laptop computer, computer server, programmable logic controller (PLC), distributed computing system (DSC), controllers, actuators, or control cards. Controllers, including master and slave controllers, may be components of the code stored in the memory 374 and executed by the processor 372. The control system 358 may include control modules and apparatuses distributed in the field.

The control system 358 may receive user input that specifies the set points of control devices or other control components in the natural-gas dehydration system 300. The control system 358 typically includes a user interface for a human to enter set points and other targets or constraints to the control system 358. In some implementations, the control system 358 may calculate or otherwise determine set points of control devices. The control system 358 may be communicatively coupled to a remote computing system that performs calculations and provides direction including values for set points. In operation, the control system 358 may facilitate processes of the system 300 including to direct operation of the flow of PW 336 and seawater 338 to the mixing system 352. Again, the control system 358 may receive user input or computer input that specifies the set points of control components in the system 100. The control system 358 may determine, calculate, and specify the set point of control devices. The determination can be based at least in part on the operating conditions of the system 300 including feedback information from sensors, meters, instruments, analyzers, and transmitters, and the like.

Some implementations may include a control room that can be a center of activity, facilitating monitoring and control of the process or facility. The control room may contain a human machine interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data. The control system 358 may also or instead employ local control (e.g., distributed controllers, local control panels, etc.) distributed in the system 300.

Figure 4:
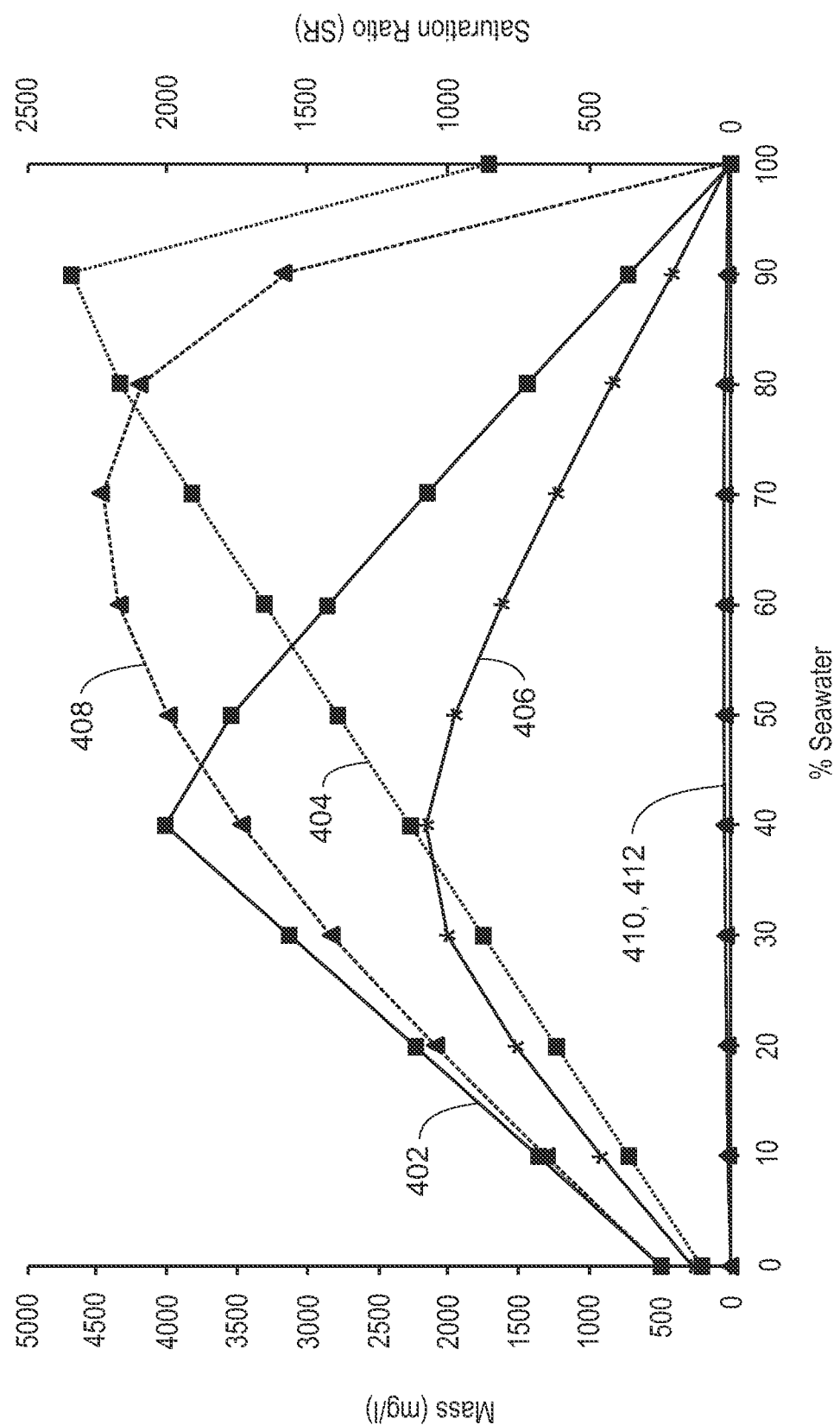
FIGS. 4 and 4A are a plot of mass of precipitate and saturation ratio (SR) for a mixture of produced water (PW) and seawater as a function of % seawater in the mixture.
Figure 5:
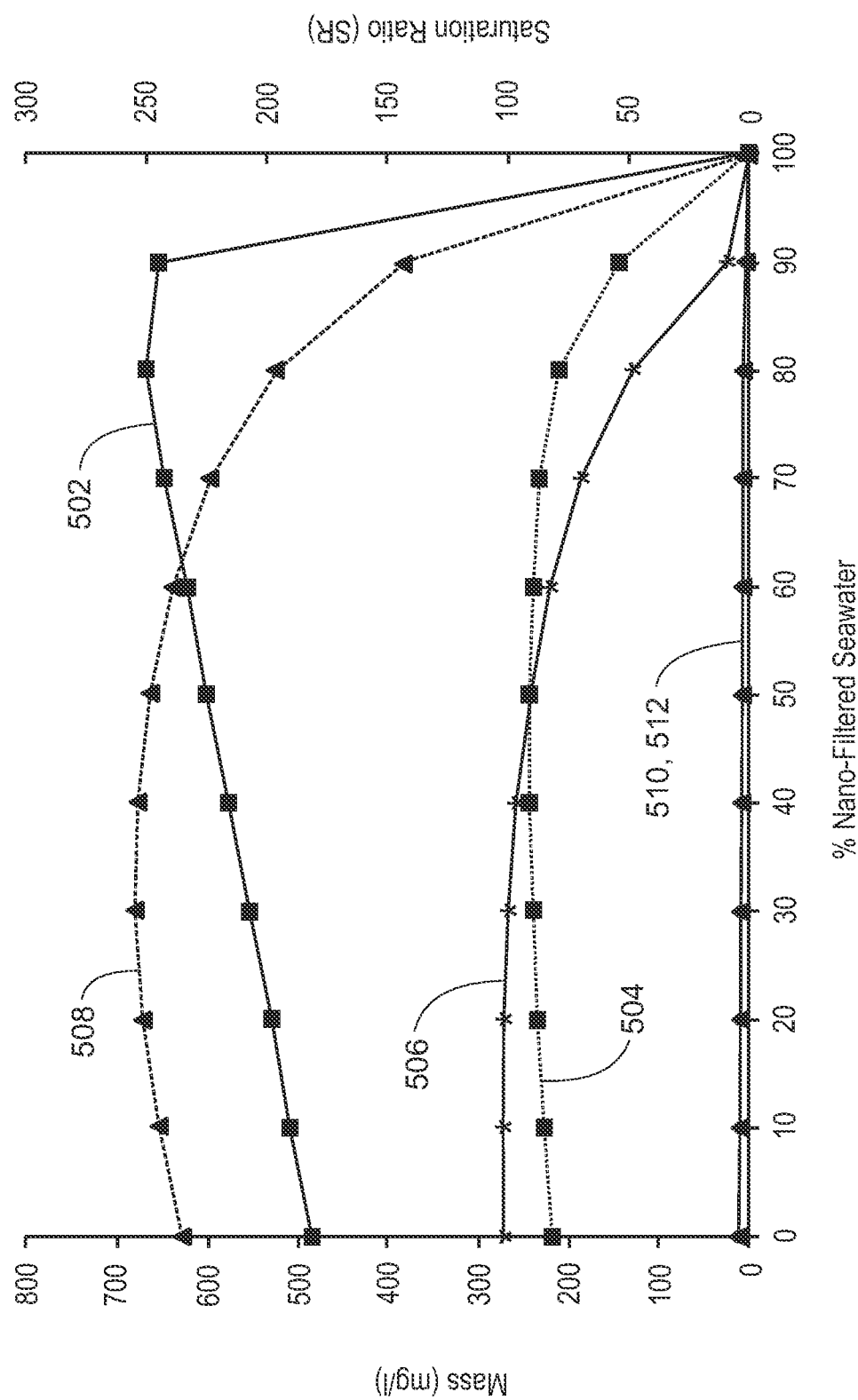
FIG. 5 is a plot of mass of precipitate and SR for a mixture of PW and nanofiltered seawater as a function of % seawater (nanofiltered) in the mixture.
Figure 6:
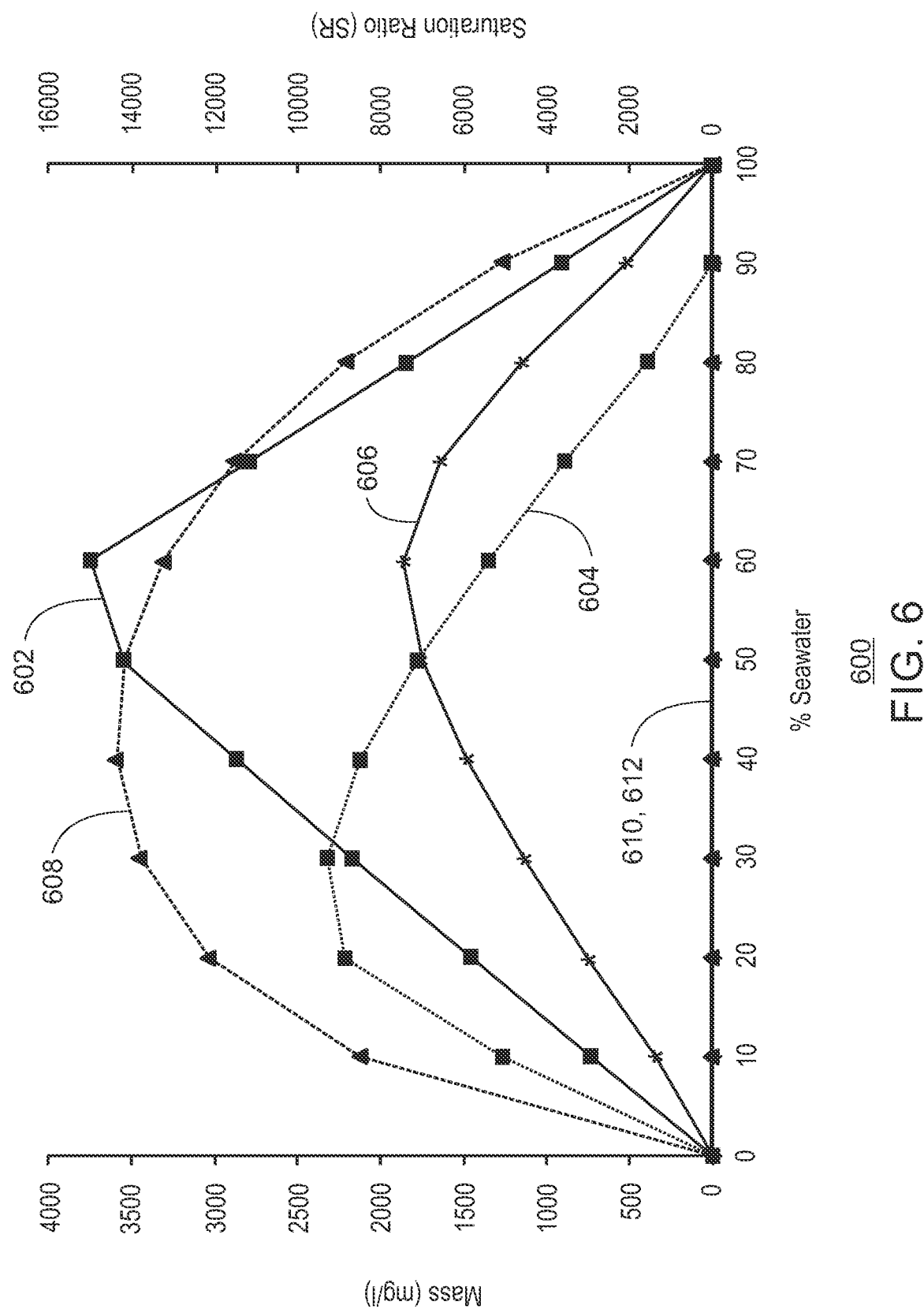
FIG. 6 is a plot of mass of precipitate and SR for a mixture of PW and as a function of % seawater in the mixture.

FIGS. 4-6 are plots giving simulated data obtained via ScaleSoftPitzer™ (version 13.0) simulation software available from the Rice University Brine Chemistry Consortium (BCC) based in Houston, Tex., USA. The ScaleSoftPitzer™ is an Excel™ based software program to predict scale formation for sixteen different minerals (including carbonates, sulfates, halite, sulfides, calcium fluoride, and silicates). This program is based upon the Pitzer theory of electrolytes. Guideline values for the interpretation of SR values are provided in Table 3. The precipitation can be in context of scaling as undesirable. The precipitation can give desired precipitate that is not scaling but is collected as product.

TABLE 3

Guidelines for interpretation of precipitates prediction results

| SR | Interpretation |
| --- | --- |
| <1 | Undersaturated, no precipitate or scaling |
| 1 to 3 | Slightly supersaturated, marginal likelihood of scaling |
| 3 to 10 | Scale likely but moderate |
| 10 to 300 | Precipitate likely to occur, severe scaling expected |
| >300 | Precipitate and severe scaling almost certain to occur |

FIGS. 4-6 include an axis for saturation ratio, which can be a value less than 1. The water can be under-saturated, saturated, or supersaturated. The term "saturation" ratio encompassed these conditions. The term "saturation" ratio can encompass values for supersaturation.

FIG. 4 is a plot 400 of mass (mg/l) of precipitate and saturation ratio (SR) (dimensionless) for a mixture of PW and seawater at 139° C. as a function of the % seawater (vol %) in the mixture. The SR is a relative number without units. The PW is the tested formation water in Table 2. The seawater is the Saudi Arabia seawater (not nanofiltered) in Table 2. Thus, FIG. 4 provides for sulfate precipitates prediction at 139° C. for a mixture of the seawater and PW of table 2. FIG. 4 shows simulated data of the sulfates precipitation. The mixture temperature of 139° C. may correspond to an example underground temperature during hydraulic fracturing operations. As indicated, the simulation data were obtained using the industry standard ScaleSoftPitzer™ software which makes use of the Pitzer equation to provide values of the supersaturation ratio (SR) of the water mixture. The degree of supersaturation is the driving force for the precipitation.

Figure 4A:
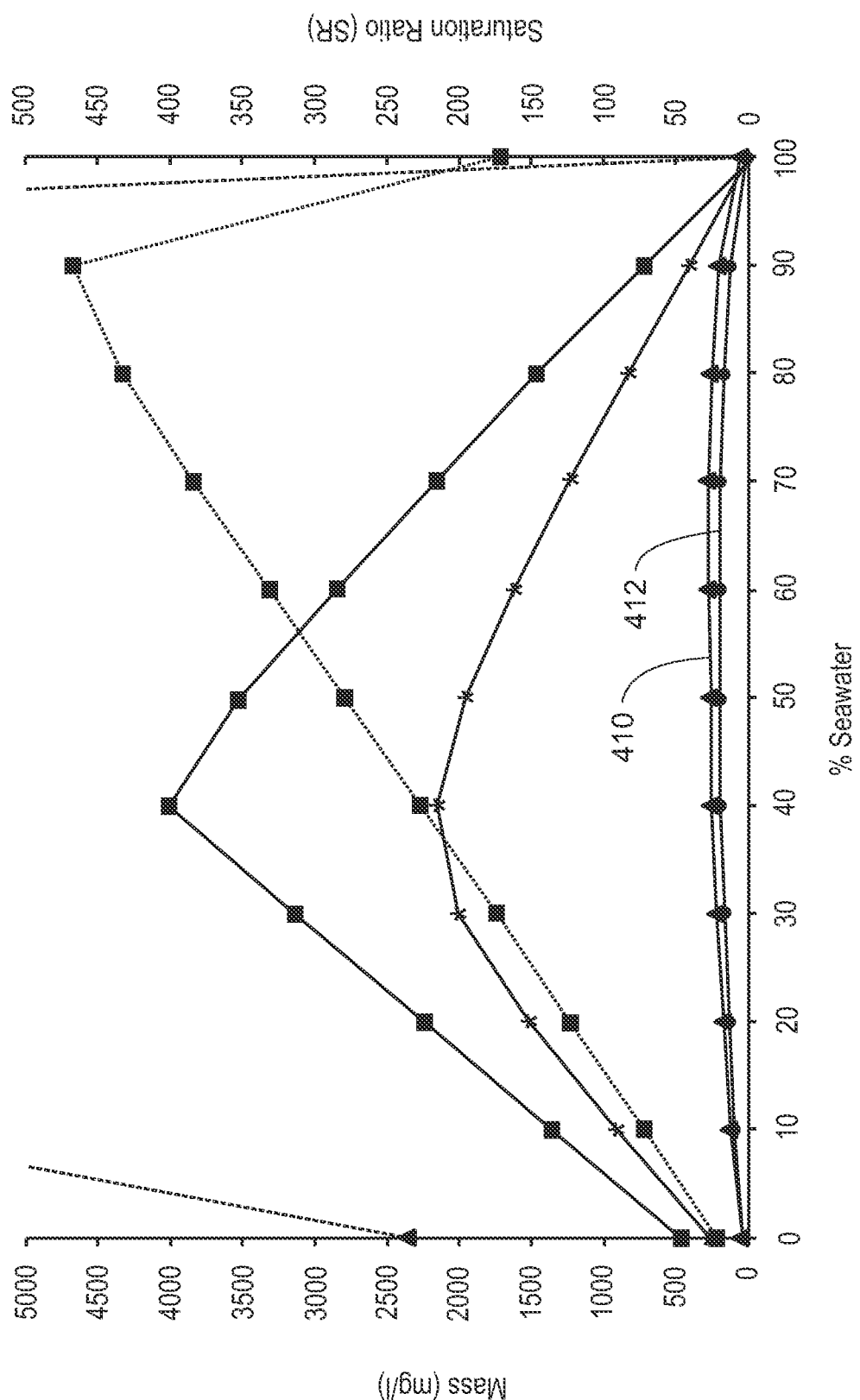

The curve 402 is the amount of $BaSO_4$ precipitate. The curve 404 is the amount of $CaSO_4$ precipitate. The curve 406 is the amount of $SrSO_4$ precipitate. The curve 408 is the SR of $BaSO_4$. The curves 410, 412 are the SR of $CaSO_4$ and $SrSO_4$, respectively, and generally overlap at the depicted scale. FIG. 4A is the lower portion of the plot 400 as expanded to indicate the distinction between the curve 410 and the curve 412. FIG. 4 shows the potential of a relatively large amount of deposition of $CaSO_4$, $BaSO_4$, and $SrSO_4$ due to mixing the seawater and formation water. After the deposit, the $SO_4$ ion in the solution will be much less than the $SO_4$ ion than in original seawater, which will be more suitable to be used as fracturing fluid.

FIG. 5 shows simulated data of the sulfates precipitation when the PW and nanofiltered Arabian seawater of Table 2 are mixed at 139° C. FIG. 5 is a plot 500 of mass (mg/l) of precipitate and SR for the mixture of the PW and the nanofiltered seawater at 139° C. as a function of the % seawater (vol %) (nanofiltered) in the mixture. The curve 502 is the amount of $BaSO_4$ precipitate. The curve 504 is the amount of $CaSO_4$ precipitate. The curve 506 is the amount of $SrSO_4$ precipitate. The curve 508 is the SR of $BaSO_4$. The curves 510, 512 are the SR of $CaSO_4$ and $SrSO_4$, respectively, and generally overlap at the depicted scale. FIG. 5 shows the potential precipitation using naofiltered seawater (having a lower concentration of SO4 ion in the nanofiltered seawater than in the seawater of FIG. 4). Use of the original seawater (FIG. 4), instead of nanofiltered seawater (FIG. 4), may precipitate more $BaSO_4$. The much higher SR when using seawater (compared to nanofiltered seawater) may help with precipitation. As mentioned, the SR is a driving force of precipitation. The high SR may mean faster precipitation. The nanofiltered seawater (compared to seawater) can help give lower sulfate in the fracturing fluid base.

FIGS. 4 and 5 indicate that significant $BaSO_4$ precipitate and severe scaling can occur when more than a few vol % of seawater or nanofiltered seawater is injected into a subterranean formation (hydrocarbon reservoir having oil and/or gas) to hydraulically fracture the subterranean formation. For these reasons, seawater should be treated for sulfate removal before the seawater is utilized in fracking operations. Conventional methods for seawater treatment for use in hydraulic fracturing operations are based on membrane filtration and desalination, essentially for the removal of sulfates.

FIG. 6 shows the results of precipitates simulation at ambient (atmospheric) conditions. The sulfate precipitates prediction is at 25° C. and 1 bar absolute (bara) for a mixture of the seawater (not nanofiltered) and PW of Table 2. FIG. 6 is a plot 600 of mass (mg/l) of precipitate and SR for a mixture of the PW and the seawater at 25° C. and 1 bara as a function of the % seawater (vol %) in the mixture. The curve 602 is the amount of $BaSO_4$ precipitate. The curve 604 is the amount of $CaSO_4$ precipitate. The curve 606 is the amount of $SrSO_4$ precipitate. The curve 608 is the SR of $BaSO_4$. The curves 610, 612 are the SR of $CaSO_4$ and $SrSO_4$, respectively, and generally overlap at the depicted scale.

FIG. 6 indicates that significant $BaSO_4$ precipitation will occur when mixing seawater and PW at 25° C. and 1 bara. The $BaSO_4$ saturation ratio is found between 0 and 14,352. The significant condition for $BaSO_4$ precipitation at predicted points is for mixing of 10 vol % to 90 vol % seawater and corresponding 90 vol % to 10 vol % high-salinity PW, with SR in the range from 5,101 to 14,352. This is coupled to a large mass precipitation of $BaSO_4$ between 910 mg/l and 3,741 mg/l. A relatively high $BaSO_4(s)$ formation rate may occur when the PW and seawater are mixed at such volume ratios, at ambient conditions.

For $CaSO_4$, the SR is between 0 and 2 when mixing seawater and high-salinity PW at 25° C. and 1 bara. The $CaSO_4$ solution is slightly supersaturated. The likelihood of $CaSO_4$ scale formation is marginal.

For $SrSO_4$, the SR is between 0 and 9 with mixing seawater and high-salinity PW at 25° C. and 1 bara. $SrSO_4$ scale deposition has potential to occur but will generally not be severe.

These results explain how drilling-grade barite can be readily obtained by the embodiments of the present techniques. The volume ratio of the seawater and PW to be mixed can be adjusted to control the $BaSO_4(s)$ precipitate formation.

Generally, pressure has no major effect on sulfates SR or scale tendency. This is indicated in Table 4 where the predicted characteristics parameters of $BaSO_4$ precipitation are reported at 1 bara and 10 bara, respectively, for the water compositions of Table 2. The data in Table 4 show that the SR is almost unchanged at 1 bara versus 10 bara. The $BaSO_4(s)$ mass precipitation rate is unchanged.

TABLE 4

$BaSO_4$ precipitation in mixture of the PW and seawater of Table 2.

| Seawater to Produced Water volume ratio | $BaSO_4$ - SR | | Barite (mg/L) | |
|---|---|---|---|---|
| | Ambient (25° C. and 1 Bara) | Pressurized (25° C. and 10 Bara) | Ambient (25° C. and 1 Bara) | Pressurized (25° C. and 10 Bara) |
| 0 | 1 | 0.99 | 0 | 0 |
| 0.1 | 5101 | 5043 | 910 | 910 |
| 0.2 | 8872 | 8777 | 1838 | 1838 |
| 0.3 | 11526 | 11410 | 2783 | 2783 |
| 0.4 | 13244 | 13117 | 3741 | 3741 |
| 0.5 | 14163 | 14029 | 3558 | 3558 |
| 0.6 | 14352 | 14217 | 2870 | 2870 |
| 0.7 | 13770 | 13638 | 2168 | 2168 |
| 0.8 | 12139 | 12016 | 1456 | 1456 |
| 0.9 | 8558 | 8465 | 732 | 732 |
| 1 | 0 | 0 | 0 | 0 |

The volume ratio of the seawater and PW to be mixed, as well as the temperature of mixing, can be adjusted to control the $BaSO_4(s)$ precipitate formation. The techniques can generally be implemented at operating pressures under 50 bara. Moreover, unlike membrane-based methods for sulfates removal, embodiments herein can be integrated with no performance loss in sulfate precipitation where pressure may vary between 1 and 10 bara with time.

The sulfate removal efficiency is a variable to adjust or optimize in order to fine tune embodiments. Table 5 gives the calculated sulfate remaining in mixed seawater and produced water after full $BaSO_4$ precipitation in the case of the water compositions given in Table 2.

TABLE 5

Sulfate content in mixture of the seawater and PW of Table 2, after $BaSO_4$ precipitation at 25° C. and 1 bara

| Seawater to Produced Water ratio | Potential barite deposition (ppm) | $SO_4$ in mixed water without $BaSO_4$ precipitation (ppm) | Removed $SO_4$ by $BaSO_4$ precipitation (ppm) | Remaining $SO_4$ in mixed water after full $BaSO_4$ precipitation (ppm) |
|---|---|---|---|---|
| 1 | 0 | 4020 | 0 | 4020 |
| 0.9 | 910 | 3618 | 375 | 3243 |
| 0.8 | 1838 | 3216 | 757 | 2459 |
| 0.7 | 2783 | 2814 | 1145 | 1669 |
| 0.6 | 3741 | 2412 | 1540 | 872 |
| 0.5 | 3558 | 2010 | 1465 | 545 |
| 0.4 | 2870 | 1608 | 1181 | 427 |
| 0.3 | 2168 | 1206 | 893 | 313 |
| 0.2 | 1456 | 804 | 599 | 205 |
| 0.1 | 732 | 402 | 301 | 101 |
| 0 | 0 | ~0 | ~0 | 0 |

As an example of fine tuning the present techniques with the specific water mixture studied above (water compositions of Table 2) as an example, the results in Table 5 confirm that the mixing of 10 vol % to 40 vol % seawater and corresponding 90 vol % to 60 vol % high-salinity PW can reduce the sulfate concentration to less than 500 ppm in the mixed water in this case. Therefore, with the feed waters studied in this example, operation at volumetric ratios of seawater (e.g., not nanofiltered) to PW in the range from 10% to 40% may be beneficial to increase the production of quality barite as well as the production of quality water for hydraulic fracturing application. The precipitate formed and collected may be $BaSO_4$ micronized to meet API Specification 13A (18th Edition) and utilized to increase mud density in drilling fluid systems (oil based or water based).

The techniques may also be utilized to treat flowback water for re-use at hydraulic fracturing sites. During fracking operations, a relatively large amount of water that was contacted with the formation flows back to the Earth surface. This flowback water is generally either disposed of or treated for re-use, depending on the contaminants in the flowback water. For instances with the Ba concentration in the flowback water as significant, embodiments here can be advantageously utilized (e.g., at the well site) to mix the flowback water with seawater to give fracturing fluid and thus the flowback water is recycled in the fracking operations.

The techniques may produce quality water for use as a fracking fluid in unconventional oil and gas production operations, and also giving the simultaneous production of drilling-grade barite ($BaSO_4(s)$). Pure barium sulfate has a specific gravity of 4.50 grams per cubic centimeter ($g/cm^3$), but drilling grade barite is expected to have a specific gravity of about 4.20 $g/cm^3$ to meet API specifications including API Specification 13A (18th Edition). Embodiments of the techniques herein may have a target specific gravity of 4.20 $g/cm^3$ for the barium sulfate as precipitated and separated. Moreover, Ca will generally be removed during the softening process and thus the separated precipitate will typically be primarily $BaSO_4$, e.g., at least 85 weight percent $BaSO_4$. The techniques may adjust, for example, the softening of the produced water and the amount of seawater added to give the precipitate that is primarily barium sulfate and having a specific gravity of 4.20 $g/cm^3$. Barium sulfate that meets API Specification 13A (18th Edition) may labeled as drilling-grade barite. Barite that meets API Specification 13A (18th Edition) may labeled as drilling-grade barite.

Embodiments may give flexibility to deliver water for hydraulic fracturing at varying flowrates and typical pressures to meet the needs of fracking operations. Unlike membrane based technologies (conventional treatment of seawater), the process according to present embodiments may adjust the production flowrate of base water for fracturing fluid in real time and can be readily placed on standby without risk of fouling or damage to the equipment. Compared to prior art, implementations of the method are cost-effective to remove sulfate from seawater as the implementations do not require cleaning or periodic maintenance of membranes.

Embodiments of the present techniques may facilitate a controlled precipitation and separation of the unwanted ions in seawater and PW. Embodiment may remove sulfate in seawater utilizing high-salinity PW containing relatively high concentrations of Ba and Ca ions, where no membrane is implemented or required. The techniques may provide an alternative option to membrane filtration for sulfate removal from seawater. The techniques may provide a solution to treat flowback water from hydraulic fracturing operations for re-use. Certain implementations make no use of fresh water for content of the water generated as a base for the fracturing fluid. Further, embodiments may provide a cost-effective solution for producing the base water and drilling-grade $BaSO_4(s)$ locally at oil and gas production facilities including at a well site in which hydrocarbon is being produced through a wellbore from a subterranean formation.

The well site may utilize the base water produced for the fracturing fluid. The process may be flexible in that the process can be adjusted in real time to deliver the water volume for a given application of hydraulic fracturing. An advantage may the flexibility to produce water for hydraulic fracturing of hydrocarbons formations on demand, near or at required or beneficial flowrate and pressure. The flow rate of the base water generated for hydraulic fracturing can be adjusted to answer the need of (in response to) fracking operations in real time. Generally, the process pressure can vary with time with no significant loss of performance. In implementations, the process can be readily stopped, put on stand-by between fracking operations, and restarted when needed.

Embodiments may be implemented locally at a drill site that utilizes the drilling-grade $BaSO_4(s)$ produced. In embodiments, the $BaSO_4(s)$ precipitate formed is readily separated from the water mixture and used in drilling operations. The method is suitable for producing drilling grade barite ($BaSO_4(s)$). Barite is a mineral composed of barium sulfate ($BaSO_4$). The API Specification 13A (18th Edition) that governs barite for drilling purposes does not refer to any specific mineral, but rather to a material that meets that specification. In practice, however, this is usually the mineral barite.

In embodiments, the water blending ratio and other actions of the process can be automated utilizing a programmed control algorithm (e.g., in a control system) and a set of control valves to mix waters at the specified or optimized flowrates. Embodiments and be more cost-effective and flexible compared to membrane nanofiltration of seawater for the development of PW based fracturing fluids including with PW having high total dissolved solids (TDS).

Figure 7:
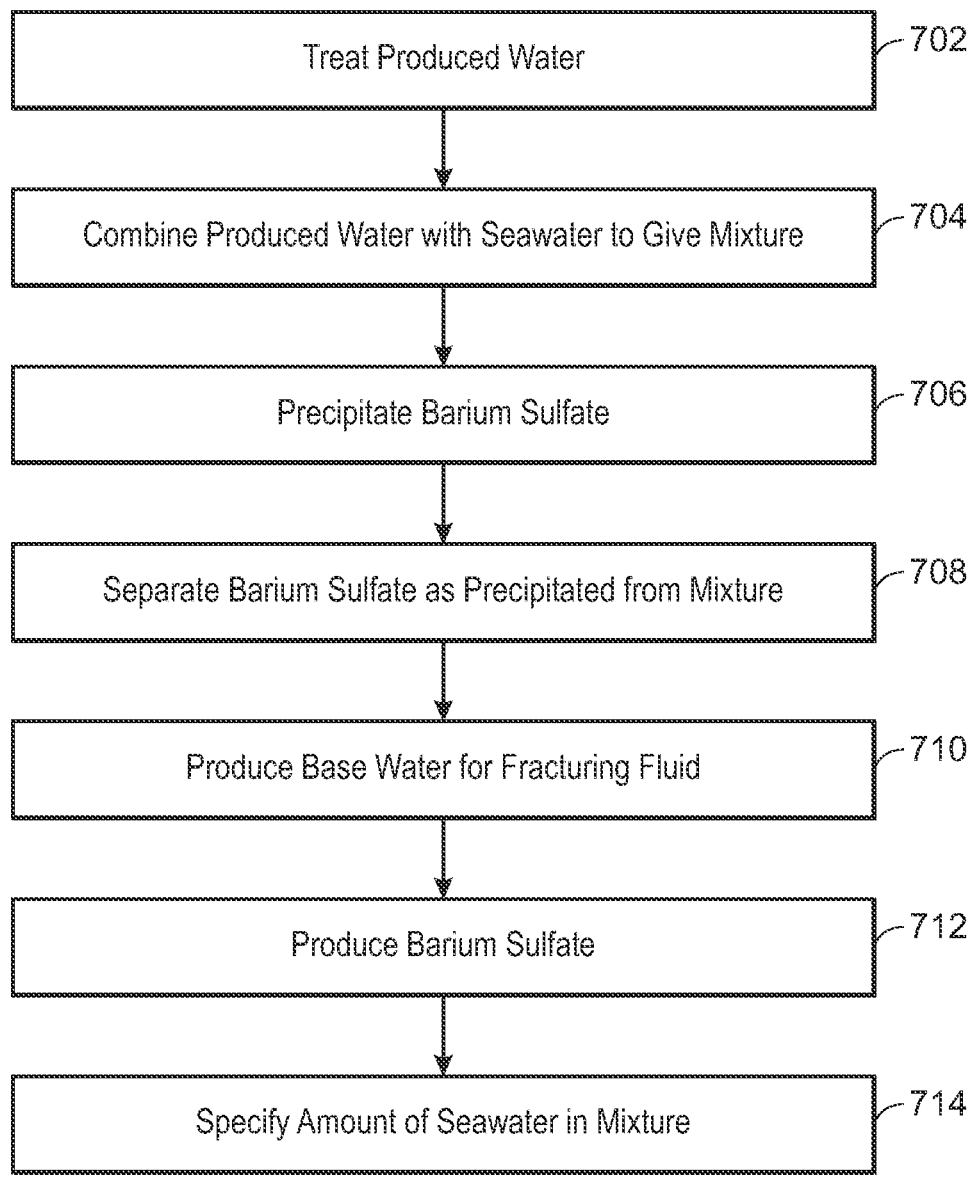
FIG. 7 is block flow diagram of a method of generating product base water (for hydraulic fracturing fluid) and also generating product barium sulfate.

FIG. 7 is a method 700 of generating base water for hydraulic fracturing fluid and producing barium sulfate. Production of the base water from PW and seawater may beneficially reduce or eliminate use of fresh water for the base water. Furthermore, a synergy of the method is simultaneous production of solid barium sulfate (a second product stream) that may be a drilling-grade barite as a weighting agent for a drilling fluid. In implementations, barium is not added to the PW. In implementations, fresh water is not added to the PW.

At block 702, the method includes treating the PW prior to combining the PW with the seawater. The PW may include water separated from hydrocarbon produced from a subterranean formation. The treating of the PW may include deoiling the PW, as discussed. The treating of the PW may include softening of the PW, as also discussed. The softening may involve treating the PW to remove calcium and magnesium from the PW. The seawater may also be treated such as filtering to remove solids or nanofiltering. However, nanofiltering of the seawater may beneficially be avoided in implementations.

At block 704, the method includes combining (e.g., mixing) the PW (e.g., as treated) with seawater to give a mixture and allow precipitation of $BaSO_4(s)$. In implementations, barium is not added to the mixture other than the barium in the PW as produced from the subterranean formation. In implementations, fresh water is not added to the mixture. The combining of the PW and seawater may occur in a mixing vessel. While the discussion herein has mentioned Arabian Gulf seawater, seawater from other regions of the world is applicable. Seawater typically has sulfate.

At block 706, the method includes precipitating the $BaSO_4(s)$ from barium in the produced water and from sulfate in the seawater in the mixture. The precipitating gives precipitate having the $BaSO_4(s)$. The precipitation may occur in the mixing vessel.

At block 708, the method includes separating the $BaSO_4(s)$ as precipitated from the mixture to give base water for a hydraulic fracturing fluid. The $BaSO_4(s)$ precipitate may be separated from the mixture, for example, in a separator vessel, such as a decanter vessel (gravity vessel) or a filter vessel.

At block 710, the method includes producing or generating the base water via the separating of the $BaSO_4(s)$ as precipitated from the mixture. Again, the base water may be base water for a fracturing fluid. The base water has a sulfate concentration less than a specified maximum concentration (threshold) (e.g., 900 ppm).

At block 712, the method includes producing the $BaSO_4(s)$ via the separating of the $BaSO_4(s)$ as precipitated from the mixture. The $BaSO_4(s)$ may be utilized as an additive (e.g., weighting agent) for drilling fluid. The method may include discharging or collecting the $BaSO_4(s)$ as separated to give drilling-grade barite as a weighting agent for drilling fluid. The method may include providing the precipitate as separated to give $BaSO_4(s)$ as a weighting agent for drilling fluid.

At block 714, the method includes specifying (or adjusting) an amount of seawater in the mixture correlative with (or in response to) an amount of the barium in the PW or to maintain the sulfate concentration in the base water less than the threshold sulfate concentration. The specifying (or adjusting) the amount of seawater in the mixture may be to increase an amount of the barium sulfate precipitated while maintaining concentration of sulfate in the base water less than the specified maximum concentration.

The specifying (or adjusting) the amount of seawater in the mixture may include specifying (or adjusting) the volume percent of the seawater in the mixture or the volume ratio of the seawater to the PW in the mixture. The amount of seawater in the mixture may be initially specified (e.g., based on the barium concentration in the PW and the sulfate concentration in the seawater). The amount of seawater may then be adjusted (e.g., in real time) in response, for example, to changes in the PW barium concentration or the seawater sulfate concentration, or in response to the sulfate concentration in the base water exceeding a threshold.

As mentioned, the maximum concentration of sulfate in the base water (and thus in the fracturing fluid) acceptable may depend on water chemistry of the fracturing fluid with the formation water of the subterranean formation being subjected to the hydraulic fracturing. For instance, the higher the concentrations of Ba, Ca, and Sr in the formation water, the lower the sulfate should be in the fracturing fluid. Thus, the method may include specifying the maximum (threshold) not to exceed for sulfate concentration in the base water in response to concentrations of Ba, Ca, and Sr in the formation water of the subterranean formation being subjected to hydraulic fracturing with the fracturing fluid incorporating the base water. In other words, the method may include specifying the maximum concentration or threshold of sulfate concentration in the base water correlative with (based on) concentration of ions (e.g., cations) in formation fluid in a subterranean formation to be hydraulically fractured with the fracturing fluid incorporating the base water, wherein the ions include barium, calcium, and strontium. The maximum sulfate concentration in the base water may be specified inversely with respect to the respective concentrations of barium, calcium, and strontium in the formation fluid in the subterranean formation to be hydraulically fractured with the fracturing fluid.

The recovery of seawater and formation water (produced water or PW) for best-quality fracturing fluid base (lower sulfate) can be a primary variable and producing the greatest amount of barium sulfate can be secondary variable. Embodiments include: (1) recovery of seawater and PW for best-quality fracturing fluid; and (2) use the precipitate generated by mixing seawater and PW to other applications, like drilling, etc.

By limiting the residual sulfate concentration, some precipitates (e.g., $CaSO_4$ and $SrSO_4$) formation can be beneficially suppressed. The ratio of PW to seawater (e.g., giving a molar ratio at least about 1.43 Ba to 1 sulfate) such that there is adequate barium (from the PW) to precipitate most of the sulfate (from the seawater) as $BaSO_4$. However, the precipitation of $BaSO_4$ and other sulfates depends on the SR of $BaSO_4$ and the other sulfates, so that the molar ratio implemented may be different (e.g., greater) than 1.43 Ba to 1 $SO_4$.

An embodiment is a method of generating base water for hydraulic fracturing fluid and producing barium sulfate. The method includes treating produced water to remove oil from the produced water. The produced water may be water separated from hydrocarbon produced from a subterranean formation. The method includes treating the produced water to remove calcium and magnesium from the produced water. The method includes combining the produced water with seawater to give a mixture, and precipitating barium sulfate in the mixture from barium in the produced water and from sulfate in the seawater. In implementations, barium is not added to the produced water, barium is not added to the seawater, and barium is not added to the mixture. In implementations, fresh water is not added to the mixture. The method includes separating the barium sulfate as precipitated from the mixture to give base water for a hydraulic fracturing fluid, the base water having less than a specified concentration of sulfate. The method includes collecting the barium sulfate as separated to give the barium sulfate as a weighting agent for drilling fluid. The barium sulfate may give drilling-grade barite. The method may include adjusting volume percent of the seawater in the mixture to maintain concentration of sulfate in the base water less than the specified concentration of sulfate. The method may include adjusting volume percent of the seawater in the mixture to increase an amount of the barium sulfate precipitated while maintaining concentration of sulfate in the base water less than the specified concentration. The method may include specifying volume percent of the seawater in the mixture correlative with an amount of the barium in the produced water.

Another embodiment is a method of generating base water for hydraulic fracturing fluid and producing barium sulfate. The method includes combining produced water having barium with seawater to give a mixture, wherein the produced water is water produced from a subterranean formation in production of hydrocarbon from the subterranean formation. The combining of the produced water with the seawater may involve mixing the produced water with the seawater. The method includes precipitating barium sulfate in the mixture from the barium in the produced water and from sulfate in the seawater to give precipitate having the barium sulfate. The method includes separating the precipitate from the mixture to give base water for a hydraulic fracturing fluid, the base water having less than a specified maximum concentration of sulfate. The method includes providing the precipitate as separated to give a weighting agent for drilling fluid. The precipitate may be or include drilling-grade barite. The method may include specifying a volume ratio of the seawater to the produced water in the mixture to give concentration of sulfate in the base water less than the specified maximum concentration. The method may include adjusting a volume ratio of the seawater to the produced water to increase an amount of the barium sulfate precipitated while maintaining concentration of sulfate in the base water less than the specified concentration. The method may include specifying a volume ratio of the seawater to the produced water in the mixture correlative with an amount of the barium in the produced water. The method may include deoiling the produced water. The method may include softening the produced water. The method may include specifying the specified maximum concentration correlative with concentration of cations in formation fluid in a subterranean formation to be hydraulically fractured with the fracturing fluid comprising the base water, wherein the cations include at least barium, calcium, and strontium.

Yet another embodiment is a method of generating base water for hydraulic fracturing fluid and producing barium sulfate. The method includes combining e.g., mixing) produced water having barium with seawater to give a mixture, wherein the produced water includes water produced from a subterranean formation. The method includes precipitating barium sulfate in the mixture from the barium and from sulfate in the seawater. The method includes separating the barium sulfate as precipitated from the mixture to give base water for a hydraulic fracturing fluid, the base water having less than a threshold sulfate concentration. The method includes providing the barium sulfate as separated to give drilling-grade barite as a weighting agent for drilling fluid. The method includes specifying an amount of the seawater combined with the produced water in response to barium concentration in the produced water. The specifying of the amount of the seawater may involve adjusting the amount of the seawater combined with the produced water in response to the barium concentration in the produced water. The specifying the amount of seawater may include adjusting a volume ratio of the seawater to the produced water in the mixture to maintain the sulfate concentration in the base water less than the threshold sulfate concentration or may include adjusting a volume percent of the seawater in the mixture to maintain the sulfate concentration in the base water less than the threshold sulfate concentration. The method may include specifying the threshold sulfate concentration correlative with concentration of cations in formation fluid in a subterranean formation to be hydraulically fractured with the fracturing fluid comprising the base water, wherein the ions include barium, calcium, and strontium. The method may include treating the seawater to remove particles from the seawater prior to combining the seawater with the produced water. The method may include deoiling and softening the produced water A number of implementations have been described. Nevertheless, it will be understood that various modifications may be made without departing from the spirit and scope of the disclosure.

What is claimed is:

1. A method of generating base water for hydraulic fracturing fluid and producing barium sulfate, comprising:
    treating produced water to remove oil from the produced water;
    treating the produced water to remove calcium and magnesium from the produced water;
    combining the produced water with seawater to give a mixture;
    precipitating barium sulfate in the mixture from barium in the produced water and from sulfate in the seawater;
    separating the barium sulfate as precipitated from the mixture to give base water for a hydraulic fracturing fluid, the base water comprising less than a specified concentration of sulfate; and
    collecting the barium sulfate as separated to give the barium sulfate as a weighting agent for drilling fluid.

2. The method of claim 1, wherein the produced water comprises water separated from hydrocarbon produced from a subterranean formation, and wherein the barium sulfate as a weighting agent comprises drilling-grade barite.

3. The method of claim 2, wherein barium is not added to the produced water, wherein barium is not added to the seawater, and wherein barium is not added to the mixture.

4. The method of claim 2, wherein fresh water is not added to the mixture.

5. The method of claim 1, comprising adjusting volume percent of the seawater in the mixture to maintain concentration of sulfate in the base water less than the specified concentration of sulfate.

6. The method of claim 1, comprising adjusting volume percent of the seawater in the mixture to increase an amount of the barium sulfate precipitated while maintaining concentration of sulfate in the base water less than the specified concentration.

7. The method of claim 1, comprising specifying volume percent of the seawater in the mixture correlative with an amount of the barium in the produced water.

* * * * *